(12) United States Patent
Lee et al.

(10) Patent No.: US 10,972,759 B2
(45) Date of Patent: Apr. 6, 2021

(54) COLOR APPEARANCE PRESERVATION IN VIDEO CODECS

(71) Applicant: Dolby Laboratories Licensing Corporation, San Francisco, CA (US)

(72) Inventors: Yoon Yung Lee, San Jose, CA (US); Neeraj J. Gadgil, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/863,022

(22) Filed: Apr. 30, 2020

(65) Prior Publication Data

US 2020/0351524 A1 Nov. 5, 2020

Related U.S. Application Data

(60) Provisional application No. 62/840,690, filed on Apr. 30, 2019.

(30) Foreign Application Priority Data

Apr. 30, 2019 (EP) .................................... 19172000

(51) Int. Cl.
*H04N 19/98* (2014.01)
*H04N 19/182* (2014.01)
*H04N 19/186* (2014.01)

(52) U.S. Cl.
CPC ........... *H04N 19/98* (2014.11); *H04N 19/182* (2014.11); *H04N 19/186* (2014.11)

(58) Field of Classification Search
CPC ..................................................... H04N 19/98
(Continued)

(56) References Cited

U.S. PATENT DOCUMENTS 10,264,287 B2  4/2019  Wen
2017/0140513 A1  5/2017  Su
(Continued)

FOREIGN PATENT DOCUMENTS

EP  3306563  4/2018
WO  2017196869  11/2017
(Continued)

OTHER PUBLICATIONS

ITU-R Recommendation ITU-R BT.1886 "Reference Electro-Optical Transfer Function for Flat Panel Displays Used in HDTV Studio Production" Mar. 2011, pp. 1-7.
(Continued)

*Primary Examiner* — Yulin Sun

(57) ABSTRACT

A standard dynamic range (SDR) image and a reference backward reshaping mapping are received. The reference backward reshaping mapping comprises a reference luma backward reshaping mapping. A color preservation mapping function is used with inputs generated from the SDR image and the reference backward reshaping mapping to determine luminance increase for SDR luma histogram bins generated based on luma codewords in the SDR image. A modified backward reshaping mapping is generated and comprises a modified luma backward reshaping mapping generated from the reference backward reshaping function based on the luminance increase for the SDR luma histogram bins. The SDR image and the modified backward reshaping mapping are encoded into an SDR video signal.

20 Claims, 9 Drawing Sheets

(58) Field of Classification Search
USPC .................................................. 375/240.24
See application file for complete search history.

(56) References Cited

U.S. PATENT DOCUMENTS

| | | | |
|---|---|---|---|
| 2018/0005357 A1* | 1/2018 | Lasserre | .................. H04N 5/57 |
| 2018/0020224 A1 | 1/2018 | Su | |
| 2018/0211369 A1* | 7/2018 | Leleannec | ............ H04N 1/4072 |
| 2019/0156467 A1* | 5/2019 | Lasserre | .................. G06T 5/40 |

FOREIGN PATENT DOCUMENTS

| | | |
|---|---|---|
| WO | 2018005705 | 1/2018 |
| WO | 2018231968 | 12/2018 |
| WO | 2019169174 | 9/2019 |
| WO | 2020033573 | 2/2020 |

OTHER PUBLICATIONS

SMPTE 2084:2014 "High Dynamic Range Electro-Optical Transfer Function of Mastering Reference Displays" Aug. 16, 2014.

\* cited by examiner

COLOR APPEARANCE PRESERVATION IN VIDEO CODECS

CROSS-REFERENCE TO RELATED APPLICATION(S)

The present application claims the benefit of priority to U.S. Provisional Patent Application No. 62/840,690, filed Apr. 30, 2019, and European Patent Application No. 19172000.2, filed Apr. 30, 2019, both of which are incorporated herein by reference in their entirety.

TECHNOLOGY

The present invention relates generally to images. More particularly, an embodiment of the present invention relates to color appearance preservation in video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luminance or luma Y and chrominance or chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE. As appreciated by the inventors here, improved techniques for color appearance preservation in video codecs are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
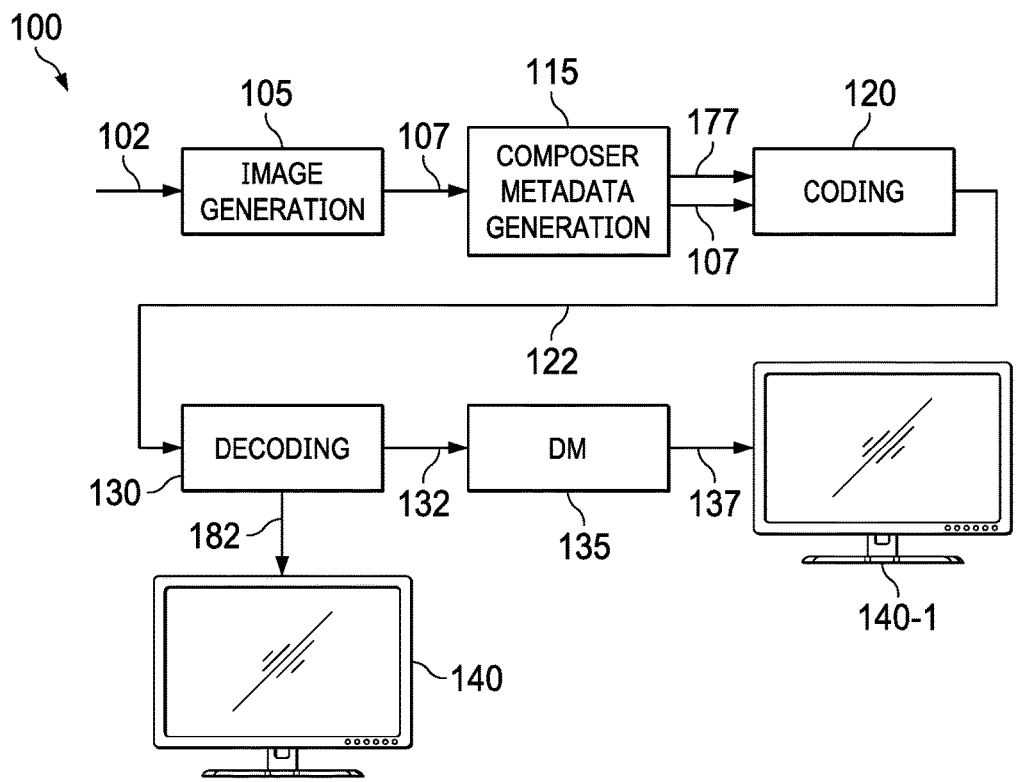
FIG. 1 depicts an example process of a video delivery pipeline.

Color appearance preservation in video codecs is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to color preservation in color rich regions of reconstructed HDR images. An SDR image and a reference backward reshaping mapping used to generate a reconstructed HDR image from the SDR image are received. The reference backward reshaping mapping comprises a reference luma backward reshaping mapping from SDR codewords into HDR codewords in the reconstructed HDR image. A color preservation mapping function is used with a set of color preservation mapping inputs generated from the SDR image and the reference backward reshaping mapping to determine a plurality of luminance increase for a plurality of SDR luma histogram bins of an SDR luma histogram, the SDR luma histogram being generated based on luma codewords in the SDR image. A modified backward reshaping mapping used to generate a color-preserved reconstructed HDR image from the SDR image is generated. The modified backward reshaping mapping comprises a modified luma backward reshaping mapping generated from the reference backward reshaping function based on the plurality of luminance increase for the plurality of SDR luma histogram bins of the SDR luma histogram. The SDR image and the modified backward reshaping mapping are encoded and transmitted into an SDR video signal. A display HDR image for rendering on a display device is caused to be generated by a recipient device of the SDR video signal based at least in the SDR image and the modified backward reshaping mapping in the SDR video signal.

Example embodiments described herein relate to color preservation in color rich regions of reconstructed HDR images. An SDR image to be backward reshaped into a corresponding reconstructed HDR image is decoded from an SDR video signal. Image metadata comprising a backward reshaping mapping decoded from the SDR (or SDR+) video signal. The backward reshaping mapping comprises a luma backward reshaping mapping from SDR codewords into HDR codewords in the reconstructed HDR image. The luma backward reshaping mapping is generated by modifying a reference luma backward reshaping mapping based at least in part on a plurality of luminance increase for a plurality of SDR luma histogram bins of an SDR luma histogram. The SDR luma histogram is generated based on luma codewords in the SDR image. The plurality of luminance increases for the plurality of SDR luma histogram bins of the SDR luma histogram is determined using a color preservation mapping function with a set of color preservation mapping inputs generated from the SDR image and the reference backward reshaping mapping. A display image derived from the reconstructed HDR image is caused to be rendered with a display device.

Example Video Delivery Processing Pipeline

FIG. 1 depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, headmounted display devices, wearable display devices, etc.

Video frames (102) is captured or generated using image generation block (105). Video frames (102) may be digitally captured (e.g. by a digital camera) or generated by a computer (e.g. using computer animation, etc.) to provide video data (107). Additionally, optionally or alternatively, video frames (102) may be captured on film by a film camera. The film is converted to a digital format to provide the video data (107). In some embodiments, the video data (107) may be (e.g., automatically with no human input, manually, automatically with human input, etc.) edited or transformed into a sequence of images before being passed to the next processing stage/phase in the video delivery pipeline (100).

The video data (107) may include SDR contents (e.g., SDR+ contents, etc.) as well as image metadata that may be used by recipient devices downstream in the video delivery pipeline (100) to perform image processing operations on a decoded version of the SDR video contents.

Example SDR video contents may, but are not necessarily limited to only, be SDR+ video contents, SDR images, SDR movie releases, SDR+ images, SDR media programs, etc.

As used herein, the term "SDR+" denotes a combination of SDR image data and metadata, which when combined together allow generating corresponding high dynamic range (HDR) image data. SDR+ image metadata may include composer data to generate backward reshaping mappings (e.g., a backward reshaping function, curve or polynomial set, multivariate multiple regression (MMR) coefficients, etc.) which when applied to an input SDR image generate a corresponding HDR image. SDR+ images allow backwards compatibility with legacy SDR displays which can ignore the SDR+ image metadata and simply display the SDR image.

Image metadata transmitted with SDR video contents to a recipient device may include composer metadata generated (e.g., automatically, in real time, in offline processing, etc.) under techniques described herein. In some embodiments, the video data (107) (e.g., after SDR content editing or color grading, etc.) is provided to a processor for composer metadata generation (115). The composer metadata generation (115) may automatically generate composer metadata with no or little human interaction. The automatically generated composer metadata can be used by recipient device(s) to perform backward reshaping operations for generating corresponding high dynamic range (HDR) images from SDR images in the video data (107).

The composer metadata generation (115) can be used to provide one or more valuable services for making video contents available to a wide variety of display devices. One of the valuable services provided by the composer metadata generation (115) is to generate the HDR images from the SDR images as mentioned above, in operational scenarios in which HDR images for video content depicted in the SDR images are not available but the SDR images depicting the video content are available. Thus, techniques as described herein can be used to generate or compose HDR video content for HDR displays, in these operational scenarios in which the SDR images are available.

One valuable service provided by the composer metadata generation (115) is to generate HDR video content optimized for HDR displays (e.g., entirely, partially, etc.) without relying on some or all of a colorist's manual operations known as "color timing" or "color grading."

Coding block (120) receives the video data (107), the automatically generated composer metadata (177), and other image metadata; and encodes the video data (107) with the automatically generated composer metadata (177), the other image metadata, etc., into a coded bitstream (122). Example coded bitstreams may include, but are not necessarily limited to, a single layer video signal, etc. In some embodiments, the coding block (120) may comprise audio and video encoders, such as those defined by ATSC, DVB, DVD, Blu-Ray, and other delivery formats, to generate the coded bitstream (122).

The coded bitstream (122) is then delivered downstream to receivers such as decoding and playback devices, media source devices, media streaming client devices, television sets (e.g., smart TVs, etc.), set-top boxes, movie theaters, and the like. In a downstream device, the coded bitstream (122) is decoded by decoding block (130) to generate decoded images 182, which may be similar to or the same as the images (e.g., SDR images, HDR images, etc.) represented in the video data (107) subject to quantization errors generated in compression performed by the coding block (120) and decompression performed by the decoding block (130).

In a non-limiting example, the video signal represented in the coded bitstream (122) may be a backward compatible SDR video signal (e.g., an SDR+ video signal, etc.). Here, a "backward compatible video signal" may refer to a video signal that carries SDR images that are optimized (e.g., with specific artistic intent preserved, etc.) for SDR displays.

In some embodiments, the coded bitstream (122) outputted by the coding block (120) may represent an output SDR video signal (e.g., an SDR+ video signal, etc.) embedded with image metadata including but not limited to inverse tone mapping metadata, the automatically generated composer metadata (177), display management (DM) metadata, etc. The automatically generated composer metadata (177) specifies backward reshaping mappings that can be used by the downstream decoders to perform backward reshaping on SDR images (e.g., SDR+ images, etc.) decoded from the coded bitstream (122) in order to generate backward reshaped images for rendering on an HDR (e.g., target, reference, etc.) display. In some embodiments, the backward reshaped images may be generated from the decoded SDR images using one or more SDR-to-HDR conversion tools implementing the backward reshaping mappings (or inverse tone mappings) as specified in the automatically generated composer metadata (177).

As used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224); U.S. Provisional Patent Application Ser. No. 62/670,086, filed on May 11, 2018, the entire contents of which are hereby incorporated by reference as if fully set forth herein.

Additionally, optionally, or alternatively, the DM metadata in the image metadata can be used by the downstream decoders to perform display management operations on the backward reshaped images generate display images (e.g., HDR display images, etc.) optimized for rendering on the HDR reference display devices, or other display devices such as non-reference HDR display devices, etc.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata from (e.g., the metadata container in, etc.) the coded bitstream (122) and use the composer metadata to compose HDR images (132), which may be backward reshaped images generated from backward reshaping the SDR images based on the composer metadata. In addition, the receiver can extract the DM metadata from the coded bitstream (122) and apply DM operations (135) on the HDR images (132) based on the DM metadata to generate display images (137) optimized for rendering on the HDR (e.g., non-reference, etc.) display device (140-1) and render the display images (137) on the HDR display device (140-1).

Composer Metadata Generation

Single Layer Inverse Display Management (SLiDM) or SDR+ can be used to enhance SDR content for rendering on HDR display devices. Luma and chroma channels (or color components) of SDR images may be mapped separately using image metadata to generate corresponding luma and chroma channels of HDR images. In some operational scenarios, source SDR images are transformed to HDR domain using composer metadata such as luma backward look-up table (BLUT), chroma MMR coefficients (also referred to as MMR polynomial coefficients), etc.

Techniques as described herein can be implemented to improve or ensure (e.g., reconstructed, composed, etc.) HDR images transformed from the source SDR images to have an increased contrast while preserve rich colors. In contrast, reconstructed HDR images under other approaches that do not implement these techniques may visually appear to have lost colors in significant chroma (or "color-rich") regions as compared with the source SDR images, especially when the HDR images contain large bright (e.g., relatively high luminance, etc.) regions alongside the regions with significant chroma components (corresponding to the color-rich regions in the source SDR images). As a result, the regions with significant chroma components look desaturated, typically darker and less colorful as compared with the source SDR images. This is especially visually noticeable where a colorful area is surrounded by a bright background in the reconstructed HDR images. The colorful area appears to be less colorful as compared with its counterpart in the source SDR images because the colorful area now looks darker in such background.

In addition to being caused by simultaneous brightness contrast increase, this problem may also be affected or worsen by display power management of a display device, as the bright background may be driven by a relatively large portion of available power of the display device thereby not giving enough power to drive the less bright but color-rich area.

Color preservation operations as described herein may be implemented or performed in one or more places in a (e.g., SLiDM, non-SLiDM, etc.) video delivery pipeline among various stages of an end-to-end video processing system. By way of illustration but not limitation, color preservation methods/algorithms/procedures can be implemented by way of modifying a reference luma BLUT to "visually preserve" the color appearance of the source SDR images in the HDR images. The reference luma BLUT may, but is not necessarily limited to only, be a static function, a dynamic function, and so forth. Example BLUTs represented by static functions are described in U.S. Provisional Patent Application No. 62/520,832, by Neeraj Gadgil, Guan-Ming Su, Tao Chen and Yoon Yung Lee, filed on Jun. 16, 2017, the contents of which are incorporated by reference in its entirety. Example BLUTs represented by dynamic functions are described in U.S. Provisional Patent Application No. 62/781,185, by Harshad Kadu, Neeraj Gadgil and Guan-Ming Su, filed on Dec. 18, 2018, the contents of which are incorporated by reference in its entirety. Some or all of these color preserving methods/algorithms/procedures can be designed in ways agnostic to how the reference BLUT is derived, what function or operations are used to derive the reference BLUT, and so forth.

To solve this color desaturation problem, anti-desaturation operations may be performed to reduce the HDR luminance difference between the two types of regions: relatively bright regions and relatively colorful regions. The anti-desaturation operations can increase color saturation in the colorful regions, making it visually pleasing. In an example, the anti-desaturation operations can be performed by designing/modifying the (reference) luma BLUT in the color-rich regions (e.g., low-to-mid-tone regions, etc.) to make those color-rich regions "bright-enough" (brighter than before) so the perceptual color loss due to a relative lack of brightness in those regions can be avoided or much reduced. In another example, the anti-desaturation operations can reduce brightness in the bright regions (e.g., highlights, background, etc.). However, this might compromise the HDR look in the bright regions and overall HDR picture quality in terms of a reduction in an overall contrast ratio in the reconstructed HDR images.

Figure 2A:
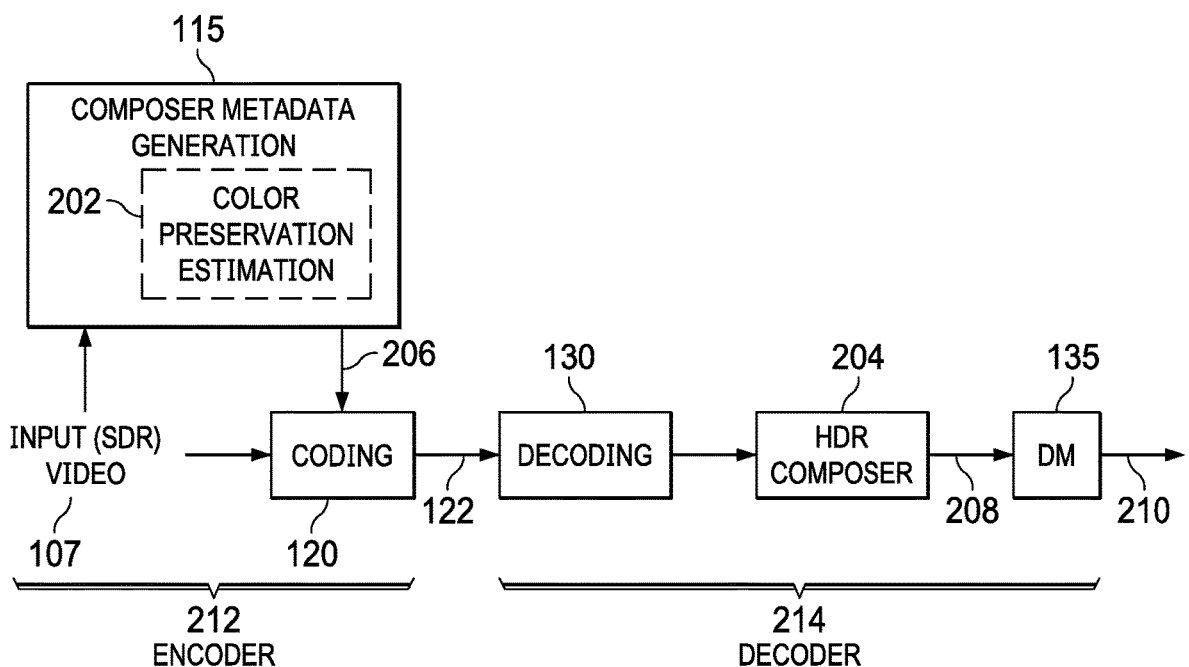
FIG. 2A illustrates an example system configuration for color preservation.

FIG. 2A illustrates an example system configuration in which an encoder 212 generates final modified luma BLUTs for input SDR video (e.g., 107, etc.) and a decoder 214 uses the final modified luma BLUTs to generate reconstructed HDR video 208 in which color loss can be avoided or much reduced.

In some operational scenarios, the encoder (212) comprises a composer metadata generation block (e.g., 115) used to receive the input SDR video (107); generate the final modified luma BLUTs with a color preservation estimation block 202; generate composer metadata 206 that specifies— or includes operational parameters that define/specify—the final modified luma BLUTs; etc. The encoder (212) further comprises a coding block (e.g., 120, etc.) to encode or multiplex the composer metadata (206) with the input SDR video (107) (or a quantized version thereof) into a coded bitstream (e.g., 122); deliver directly or indirectly to one or more recipient devices; etc.

The decoder (214) comprises decoding block (e.g., 130, etc.) used to receive the coded bit stream (122); demultiplex the composer metadata and SDR video (e.g., the same as the input SDR video (107) subject to quantization/dequantization and other coding errors, etc.) from the coded bitstream (122); etc. The decoder (214) further comprises an HDR composer 204 used to apply invert mapping and HDR image reconstruction based on the composer metadata that includes the final luma BLUTs to the SDR video to generate the reconstructed HDR video (208). Additionally, optionally or alternatively, the decoder (214) comprises a DM block (e.g., 135, etc.) to generate display mapped video content 210 from the reconstructed HDR video (208) for rendering on a display device.

To generate a final luma BLUT, luma and chroma statistics can be collected using an (input) source SDR image. An amount of luma BLUT increase can be estimated for one or more luma ranges that may be affected by color loss using a color compensation mapping function. The color preservation mapping function is used to compensate some or all of the color loss that may affect a reconstructed HDR image derived from the source SDR image using a currently available luma BLUT (e.g., a reference luma BLUT, etc.).

The amount of luma BLUT increase estimated based on the source SDR image, the reconstructed HDR image using the current available luma BLUT, the color preservation mapping function, etc., may be used to construct a new luma BLUT to avoid or reduce the color loss in the reconstructed HDR image.

In various embodiments, a BLUT modification process including but not limited to generating luma BLUT increase and constructing a new luma BLUT as discussed herein may be repeated zero, one or more times. For example, a (second) iteration of the BLUT modification process may be performed to improve performance and effectiveness to avoid or reduce the color loss in the color rich regions in a final reconstructed HDR image.

The BLUT modification process may be integrated with any in a wide variety of video encoding pipelines (e.g., SLiDM based, etc.) including but not necessarily limited to only: real-time encoding, broadcasting, over-the-top (OTT) streaming, on-the-fly metadata generation, and so forth.

Figure 3A:
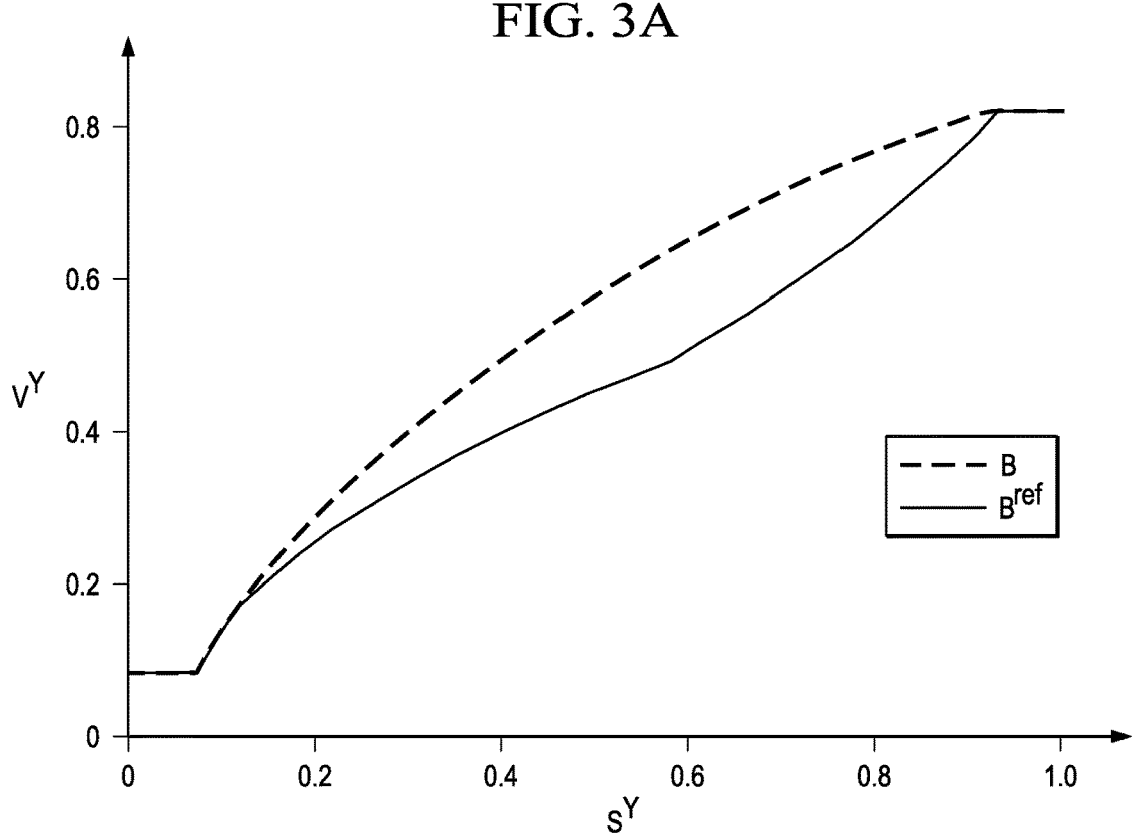
FIG. 3A shows an example of BLUT increase in colorful region.

FIG. 3A shows an example of BLUT increase in colorful region. Under techniques as described herein, a new BLUT for color preservation may be derived from a reference BLUT to preserve color saturation in non-bright areas of a reconstructed HDR image derived from an input SDR source image.

Color Compensation Mapping

By way of example but not limitation, a color preservation mapping function may be generated as follows.

Let $x = [v^{Y\{BA\}}, v^{Y\{NBA\}}, v^{\pi\{NBA\}}]^T$ denote an input vector having three terms (or vector components) as shown in the square brackets. A first term $v^{Y\{BA\}}$ of the input vector may represent luminance values in bright areas of a reconstructed HDR image from a source SDR image through a currently applicable luma BLUT (which initially may be a reference luma BLUT such as based on a static tone-mapping function, a dynamic tone-mapping function, etc.). A second term $v^{Y\{NBA\}}$ of the input vector may represent luminance values in non-bright areas of the reconstructed HDR image. A third term $v^{\pi\{NBA\}}$ of the input vector may represent chroma saturation values in non-bright areas of the reconstructed HDR image.

The chroma saturation value (e.g., $v^{\pi}$, etc.) of a pixel (e.g., an HDR pixel, etc.) in an example color space such as a YCbCr color space with Y, Cb, Cr color components (e.g., $v^Y$, $v^{Cb}$, $v^{Cr}$, etc.) may be computed as follows:

$$v^{\pi} = \sqrt{(v^{Cb} - 0.5)^2 + (v^{Cr} - 0.5)^2} \quad (1)$$

Let $f_{v^Y}(x)$ denote a function to estimate target luminance values $\hat{v}_{req}^{Y\{NBA\}}$ in non-bright areas. A variety of prediction or estimation methods/algorithms may be used to estimate the target luminance values $\hat{v}_{req}^{Y\{NBA\}}$ in the non-bright areas. By way of example but not limitation, a linear regression method/algorithm may be used to estimate $\hat{v}_{req}^{Y\{NBA\}}$ as follows:

$$\hat{v}_{req}^{Y\{NBA\}} = f_{v^Y}(x) = \omega^T \cdot \varphi \qquad (2)$$

where $\varphi$ is the vector formed by the HDR luminance values from the bright areas (denoted as "BA") and non-bright areas (denoted as "NBA") and the chroma saturation values from the non-bright areas, namely $v^{Y\{BA\}}$, $v^{Y\{NBA\}}$, $v^{\pi\{NBA\}}$ respectively, and their cross-product terms up to the $3^{rd}$ order, as follows:

$$\varphi = [1, v^{Y\{BA\}}, v^{Y\{NBA\}}, v^{\pi\{NBA\}}, (v^{Y\{NBA\}} \cdot v^{\pi\{NBA\}}),$$
$$(v^{Y\{BA\}})^2, (v^{Y\{NBA\}})^2, (v^{\pi\{NBA\}})^2,$$
$$(v^{Y\{NBA\}} \cdot v^{\pi\{NBA\}})^2, (v^{Y\{BA\}})^3, (v^{Y\{NBA\}})^3,$$
$$(v^{\pi\{NBA\}})^3, (v^{Y\{NBA\}} \cdot v^{\pi\{NBA\}})^3]^T \qquad (3)$$

As illustrated, the vector $\varphi$ has a total of 13 entries, $\phi_k$, where $k=0, 1, \ldots 12$. The weights-matrix $\omega$ contains the weights $\omega_k$, $k=0, 1, \ldots 12$, one for each entry of $\varphi$. The target luminance values $\hat{v}_{req}^{Y\{NBA\}}$ may be represented as a linear combination of the entries of the weights-matrix $\omega$ and the entries of $\varphi$, as follows:

$$\hat{v}_{req}^{Y\{NBA\}} = f_{v^Y}(x) = \omega^T \cdot \varphi = \Sigma_{k=0}^{K-1} \omega_k \phi_k \qquad (4)$$

Additionally, optionally or alternatively, NBA hue values may be collected and represented in a vector such as $\varphi$.

Additionally, optionally or alternatively, sizes (e.g., spatial sizes, number of pixels, number of rows and/or columns, etc.) of BA and NBA may be collected and represented in a vector such as $\varphi$.

The color preservation mapping function ($f_{v^Y}(x)$) may be obtained using (e.g., subjective, empirical, repetitive, artificial intelligence or AI based, machine learning or ML based, etc.) color perception experiments in connection with SDR images and reconstructed HDR images derived from the SDR images using multiple possible luma mappings. An SDR image and a reconstructed HDR image that is deemed to be the closest in color perception (e.g., in color rich regions, etc.) to the SDR image among multiple reconstructed HDR images all of which are derived from the SDR image are used to provide a data point for generating the color preservation mapping function. A population of data points collected from a population of SDR images and reconstructed HDR images generated from the population of SDR images may be used to generate the color preservation mapping function through a linear regression method or the like, for example through the linear regression method/algorithm based at least in part on expressions (1) through (4) above.

Luma Mapping Modification

To preserve the NBAs' color appearances, a luma BLUT increase for luminance levels used in the NBAs may be made or added to a current luma BLUT to achieve or produce target HDR luminance values for the NBAs higher than HDR luminance values generated from the current luma BLUT.

This needs first detecting NBAs and BAs in an (input) source SDR image or a reconstructed HDR image corresponding to the source SDR image. Once the NBAs and BAs are identified, luma and chroma statistics can be collected using the source SDR image. The luma and chroma statistics can then be used as some or all input parameters for estimating the target HDR luminance values.

In some operational scenarios, NBAs and BAs of an image are detected in a spatial domain using one or more image analysis techniques such as object segmentation, spatial visual feature detection, image morphological operations, etc. However, detecting visual features in the spatial domain may be relatively difficult to implement as well as may be relatively unreliable, especially where video content contains moving objects or image features with dynamically changing spatial shapes.

In some operational scenarios, NBAs and BAs are not spatially delineated or detected. Rather, luminance ranges or histogram bins may be analyzed to identify disjoint or successive regions in luminance ranges or histograms as (e.g., mainly, predominantly, probably, heuristically, etc.) corresponding to those of NBAs and BAs. It is unnecessary to correlate precisely a luminance value or range or histogram bin to a spatially delineated NBA or BA. Additionally, optionally or alternatively, BLUT modification can be applied to luminance values or ranges or histogram bins in an overall image without determining any region-specific luminance values or ranges or histogram bins to a specific spatial region such as an NBA or BA in the image.

As compared with the approach that relies on detecting NBAs and BAs in the spatial domain, BLUT modification operations as described herein can be relatively efficiently implemented as well as can perform relatively reliably with a wide variety of video contents, regardless of whether such video contents contain moving objects or image features with changing spatial shapes.

Figure 2B:
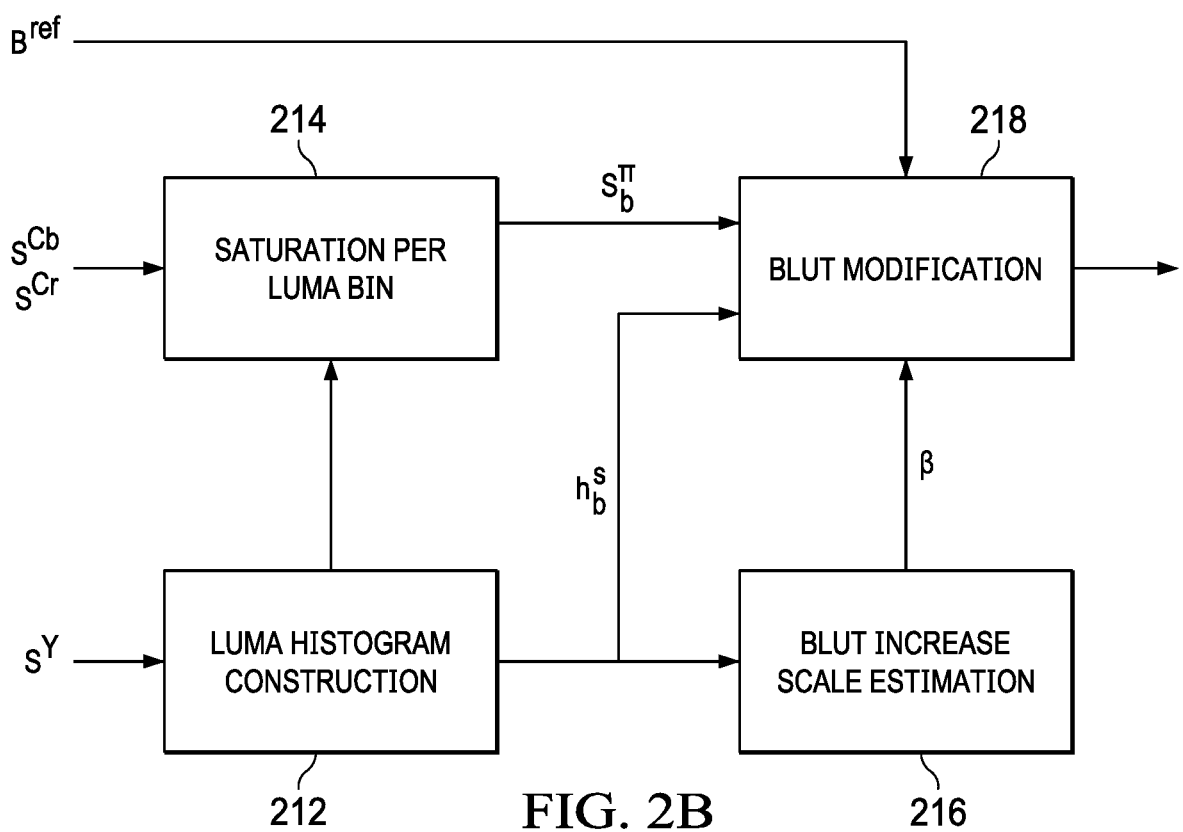
FIG. 2B and FIG. 2C illustrate example processing blocks for color preservation in color-rich regions of reconstructed HDR images.

FIG. 2B illustrates example processing blocks for generating BLUT modifications that preserve colors or appearances (relative to source SDR images) in color-rich regions or NBAs of reconstructed HDR images. The processing blocks as illustrated may be implemented or performed by one or more computing devices such as an encoder, a decoder, a transcoder, etc. The BLUT modifications generated by the processing blocks of FIG. 2B can alter or modify a given reference (or current) BLUT (denoted as $B^{ref}$) for each luma range corresponding to each histogram bin of NBAs.

Block 212 comprises receiving luminance values (denoted as $S^Y$) of pixels in an input source SDR image, using the luminance values of pixels in the input source SDR image to construct a luminance histogram (denoted as $h_b^Y$) of the input source SDR image, outputting the luminance histogram ($h_b^Y$) of the input source SDR image to blocks 214, 216 and 218, and so forth.

Block 214 comprises receiving chroma values (denoted as $S^{Cb}$ and $S^{Cr}$) of the pixels in the input source SDR image, receiving the luminance histogram ($h_b^Y$) of the input source SDR image from block 212, using the chroma values of pixels in and the luminance histogram of the input source SDR image to compute a representative (e.g., average, etc.) color saturation value (denoted as $s_b^\pi$) for each luminance bin in the luminance histogram ($h_b^Y$) of the input source SDR image, outputting the representative color saturation value ($s_b^\pi$) for each luminance bin in the luminance histogram ($h_b^Y$) of the input source SDR image to block 218, and so forth.

Block 216 comprises receiving the luminance histogram ($h_b^Y$) of the input source SDR image from block 212, estimating a BLUT increase scale (denoted as $\beta$) for each histogram bin of the luminance histogram ($h_b^Y$) of the input source SDR image using the histogram statistics, outputting the BLUT increase scale ($\beta$) to block 218, and so forth.

Block 218 comprises receiving the representative color saturation value ($s_b^\pi$) for each luminance bin in the luminance histogram ($h_b^Y$) of the input source SDR image from block 214, receiving the luminance histogram ($h_b^Y$) of the input source SDR image from block 212, receiving the BLUT increase scale ($\beta$) from block 216, using the BLUT increase scale ($\beta$) to tune a BLUT increase (or BLUT modification) in HDR luminance values as generated from the reference (or current) BLUT ($B^{ref}$) in various luma ranges based on relative sizes of BAs and NBAs in the input source SDR image, generating or constructing a new luma BLUT by modifying the reference BLUT ($B^{ref}$) in each luma bin such that the new luma BLUT preserves or improves NBA color appearance in a new reconstructed HDR image based on the new luma BLUT, and so forth.

A color preservation mapping function may be used to estimate the BLUT increase (or BLUT modification) representing a target amount of NBA luminance increase in corresponding luma bins in the NBAs. The target amount of NBA luminance increase in corresponding luma bins in the NBAs represents a difference between target NBA luminance values and (reference) NBA luminance values, the latter of which may be obtained using the reference (or current) BLUT ($B^{ref}$).

In addition, the target HDR luminance values can be estimated from the color preservation mapping function using inputs or input vectors (e.g., to a regression model used to generate the color preservation mapping function, etc.) obtained or constructed from the luminance histogram ($h_b^Y$) of the input source SDR image and the chroma saturation values ($s_b^\pi$) per luma bin, as computed in block 214.

Collecting Histogram Statistics

Techniques as described herein can be implemented to operate with images represented in a variety of color spaces. By way of example but not limitation, an input source SDR image may be an SDR YUV 420 image that contains P luma samples and P/4 chroma samples (each having two chroma values in Cb and Cr color components of an YCbCr color space). Luma samples of the SDR YUV 420 image may be downsampled to contain P/4 luma samples.

Let $s_i^y$ be the i-th normalized luma pixel (or a luminance value of the i-th pixel) of the luma downsampled SDR image. As used herein, a normalized luma or chroma pixel refers to a luma or chroma pixel component with a normalized value within a range of normalized values such as between zero (0) and one (1). Let $s_i^{Cb}$, $s_i^{Cr}$ be the i-th normalized chroma pixel (or chroma values of the i-th pixel) corresponding to the i-th normalized luma $s_i^y$ of the luma downsampled SDR image. Let $N_B$ be SDR signal bit depth. Let $s_{min}^Y$ and $s_{max}^Y$ be the SDR codewords at the (e.g., SMPTE, etc.) minimum and maximum, respectively.

In some operational scenarios, luma and chroma statistics can be collected based on the luma and chroma values of the luma downsampled SDR image.

Let $h_b^s$ denote (the b-th luma histogram bin of) an SDR luma histogram using only significant SDR pixels in the luma downsampled SDR image, where b denotes the histogram bin index, b=0, 1, . . . , N−1, N denotes a count (or total number) of luma histogram bins in the SDR luma histogram.

Let $\bar{s}_b^\pi$ be a representative (e.g., average, etc.) chroma saturation value computed in the b-th luma histogram bin, using only the significant SDR pixels from the b-th luma histogram bin.

A significant pixel is defined as any pixel satisfying conditions as follows:

The pixel's luma histogram bin index (b) is higher than the lowest (e.g., SMPTE, etc.) codeword bin index $b_{Th}^{min}$, (logical) or The pixel's chroma saturation value is above a minimum chroma saturation threshold (denoted as $s_{Th}^\pi$).

By way of example but not limitation, for a 10-bit signal, 64 may be set or defined as the lowest allowed (e.g., SMPTE range, etc.) codeword. If the SDR luma histogram has N=64 bins for 1024 codewords, then the lowest (e.g., SMPTE, etc.) codeword bin index $b_{Th}^{min}$ equals four (4). Thus, each (e.g., the i-th, etc.) pixel with a luma histogram bin index $b>b_{Th}^{min}=4$ and/or $s_i^\pi>s_{Th}^\pi$ is considered. An example value of the minimum chroma saturation threshold $s_{Th}^\pi$ may be, but is not necessarily limited to only, 0.004, etc. In some operational scenarios, the value of the minimum chroma saturation threshold $s_{Th}^\pi$ can be specifically selected to to avoid counting letterbox pixels. The letterbox pixels do not have significant chroma saturation and may have luma values that are relatively close to the lowest allowed (e.g., SMPTE range, etc.) codeword.

Let $\Lambda_b$ be a set of significant pixel indices in the b-th luma histogram bin. Thus, the cardinality or element count of $\Lambda_b$ is the b-th luma histogram bin $h_b^s$. A total number of significant pixels in the SDR luma histogram may be computed as $$P_{sig} = \sum_{\forall b} h_b^s.$$

A representative (e.g., average, etc.) chroma saturation value in each luma histogram bin is computed by dividing a summed up chroma saturation in each luma histogram bin by the number of luma pixels in the respective luma histogram bin, as follows:

$$\bar{s}_b^\pi = \frac{\sum_{i \in \Lambda_b} s_i^\pi}{h_b^s} \qquad (5)$$

Then, a normalized luma histogram (denoted as $\bar{h}_b^s$) for the b-th luma histogram bin may be obtained by dividing the luma histogram in each bin by the total number of significant pixels $P_{sig}$, as follows:

$$\bar{h}_b^s = \frac{h_b^s}{P_{sig}} \qquad (6)$$

An example procedure to compute luma histogram statistics including associated chroma saturation values is illustrated in TABLE 1 below.

TABLE 1

```
// initialization
  P_sig = 0
  h_b^s, h̄_b^s, s̄_b^π = 0 for b = 0, 1, . . . , N − 1 // standard deviation in luma
    bins
// compute non-normalized luma histogram and chroma saturation in luma
    bin
for (i = 0; i < P/4 ; i++)
  // compute luma bin of j'th pixel
  b = ⌊s_i^y · N⌋
  // compute chroma saturation at each pixel
  s_i^π = √((s_i^Cb−0.5)^2(s_i^Cr−0.5)^2)
  // check if the pixel is "significant"
  if (b > b_Th^min OR s_i^π > s_Th^π )
    P_sig ++
    h_b^s ++
    s̄_b^π = s̄_b + s_i^π
  end
end
// Take average chroma saturation and normalize luma histogram if valid
    division
```

TABLE 1-continued

```
if ( P_sig)
  for (b = 0; b < N; b++)
    if ( h_b^s )
      s̄_b^π = s_b^π / h_b^s
      h̄_b^s = h_b^s / P_sig
    end
  end
end
```

BLUT Increase Scale Estimation

As discussed, a regression model may be used to estimate target HDR luminance values based on luminance values and color saturation values collected with a set of (e.g., training, reference, etc) SDR images, multiple luma mappings, reconstructed HDR images using the SDR images and the multiple luma mappings, and so forth.

In some operational scenarios, the regression model used to derive a color preservation mapping function may not consider relative BA and NBA sizes, a ratio of total numbers of pixels in BAs and NBAs, etc. Given that BAs and NBAs may be divided based (e.g., solely, largely, saliently, etc.) on SDR luma intensities as represented in an input source SDR image, several regions or objects with varying luma and/or chroma values may be depicted in the input source SDR image. Relative sizes of BAs and NBAs can become important factors in determining or influencing how a viewer may perceive color appearances of color rich regions in a reconstructed HDR image derived from the input source SDR image.

Color appearances of NBAs may not be lost (or may not become desaturated) when the NBAs is larger in size (or in total number of pixels) than BAs.

In some operational scenarios, the SDR image contains several regions (or objects) that are colorful NBA. For example, there exist two distinct regions (or objects)—or two distinct colorful NBA objects—in the SDR image with different sizes (or different total numbers of pixels), colors and luminance. The first colorful NBA object is smaller in size than the BA in the SDR image. The second colorful NBA object has relatively less color saturation but larger in size than the first colorful NBA object. As a result, the second colorful NBA object visually dominates the look of the overall SDR image, making color desaturation in the first colorful NBA object barely noticeable.

In the present example, if the NBA HDR luminance is increased, then the resulting reconstructed HDR image may appear unnecessarily brighter and thus may have a "washed-out" look. To avoid this problem, BLUT modification operations as described herein take into account relative sizes of BAs and NBAs. A BLUT increase scale ($\beta$) that is determined dependent on BA/NBA sizes can be used as a multiplier to estimate BLUT lifts/increases to control actual amounts of BLUT lifts/increases.

In some operational scenarios, the BLUT increase scale ($\beta$) is constant over an entire image (or luma histogram bins derived therefrom) and serves/provides a relative-size dependent auto-tuning mechanism used to decide or automatically tune how aggressively, moderately, or minimally, BLUT lifts/increases should be applied given the BLUT lifts/increases that are determined using a color preservation mapping function generated from a regression model that may or may not take relative sizes into account.

To determine or estimate the relative sizes of BAs and NBAs, a boundary luminance value (denoted as $\psi_{Th}$) separating between NBA luminance values corresponding to NBAs and BA luminance values corresponding to BAs may be determined or estimated (e.g., heuristically, in a simplified or even over-simplified way, etc.) by using a separation threshold, $\psi_{Th}$ expressed in terms of normalized HDR intensity.

As used herein, NBA luminance values may refer to those luminance values deemed as likely existing in the NBAs; it should be noted that the NBAs could very well contain outlier luminance values (less likely luminance values) that are outside the NBA luminance values. Likewise, BA luminance values may refer to those luminance values deemed as likely existing in the BAs; the BAs could very well contain outlier luminance values (less likely luminance values) that are outside the BA luminance values.

The boundary luminance value ($\psi_{Th}$) may be configurable programmatically by one or more processing blocks or manually by a designated user. Additionally, optionally or alternatively, the boundary luminance value ($\psi_{Th}$) may be determined empirically, through image analysis of a population of images, through machine learning and artificial intelligence, and so forth.

By way of example but not limitation, boundary luminance value ($\psi_{Th}$) may be set as L2PQ (250), where L2PQ represents a linear-to-perceptual-quantization codeword conversion function that converts linear light into a PQ codeword on a scale of (0,1). For example, given a linear luminance intensity value, a perceptual-quantized or PQ (e.g., SMPTE, etc.) codeword may be given by L2PQ ( ) using the linear luminance intensity value as input. Thus, given an HDR linear luminance intensity value of 250 (e.g., in nits, etc.), L2PQ (250) returns an HDR PQ codeword that gives or corresponds to (linear light having) the HDR linear luminance intensity value of 250.

A threshold (or minimum) SDR codeword $s_{Th}^Y$ that maps to an HDR intensity that is equal or just above this boundary luminance value ($\psi_{Th}$) may be determined. A bin index $b_{Th}$ for a luma histogram bin that contains the minimum SDR codeword $s_{Th}^Y$ may also be determined. The bin index $b_{Th}$ may be referred to as a bin threshold that separates NBA luma histogram bins and BA luma histogram bins.

As used herein, NBA luma histogram bins may refer to those SDR luma histogram bins containing luminance values deemed as likely existing in the NBAs; it should be noted that the NBAs could very well contain outlier luminance values (less likely luminance values) that are outside the NBA luminance values and that are outside the NBA luma histogram bins. Likewise, BA luma histogram bins may refer to those SDR luma histogram bins containing luminance values deemed as likely existing in the BAs; the BAs could very well contain outlier luminance values (less likely luminance values) that are outside the BA luminance values and that are outside the BA luma histogram bins.

An example procedure for determining the threshold (or minimum) SDR codeword $s_{Th}^Y$ and the bin index $b_{Th}$ is illustrated in TABLE 2 below.

TABLE 2

```
// find s_Th^Y by scanning through s^Y
  s_Th^Y = argmin{B^ref(s^Y) ≥ ψ_Th}
           s^Y
// compute b_Th
  b_Th = ⌊s_Th^Y · N⌋
```

The size of an area (BA or NBA) is a function of SDR luma histogram ($h_b^s$) in the bins corresponding to that area, because $h_b^s$ represents the total number pixels in a bin. Let $N_{NBA}$ be the total number of NBA bins each with non-zero total numbers of pixels. Let $N_{BA}$ be the total number of BA bins each with non-zero total numbers of pixels.

A ratio (z) of BA-to-NBA sizes can be determined using weighted averages of non-empty bins in respective areas (the BAs and the NBAs). The weights used in averaging may be $h_b^s$ which assigns more importance or larger weights to bins with larger total numbers of pixels. To minimize numeric stability problems arising from very large or very small area sizes, a logarithm operation may be applied to computing the ratio (z) of BA-to-NBA sizes, as follows:

$$z = \frac{1}{2} \log \left( \frac{\frac{1}{N_{BA}} \sum_{b \geq b_{Th}, h_b^s \neq 0} (h_b^s)^2}{\frac{1}{N_{NBA}} \sum_{b < b_{Th}, h_b^s \neq 0} (h_b^s)^2} \right) \quad (7)$$

In some operational scenarios, the BLUT increase scale ($\beta$) may be determined as a function (denoted as $\beta(z)$) of the ratio (z) of BA-to-NBA sizes. If the BAs are significantly larger than the NBAs (z→∞), then the BLUT increase scale ($\beta$) may be set to close to one (1), causing or resulting in the maximum allowed BLUT increase. As the ratio (z) of BA-to-NBA sizes decreases, the BLUT increase scale ($\beta$) decreases, causing or resulting in a decreasing amount of BLUT increase as compared with the maximum allowed BLUT increase. If the BAs are significantly smaller than the NBAs (z→−∞), then the BLUT increase scale ($\beta$) may be set to close to zero (0), making an applicable BLUT increase close to 0, thus avoiding or minimizing BLUT modification (relative to the reference luma BLUT).

Figure 3B:
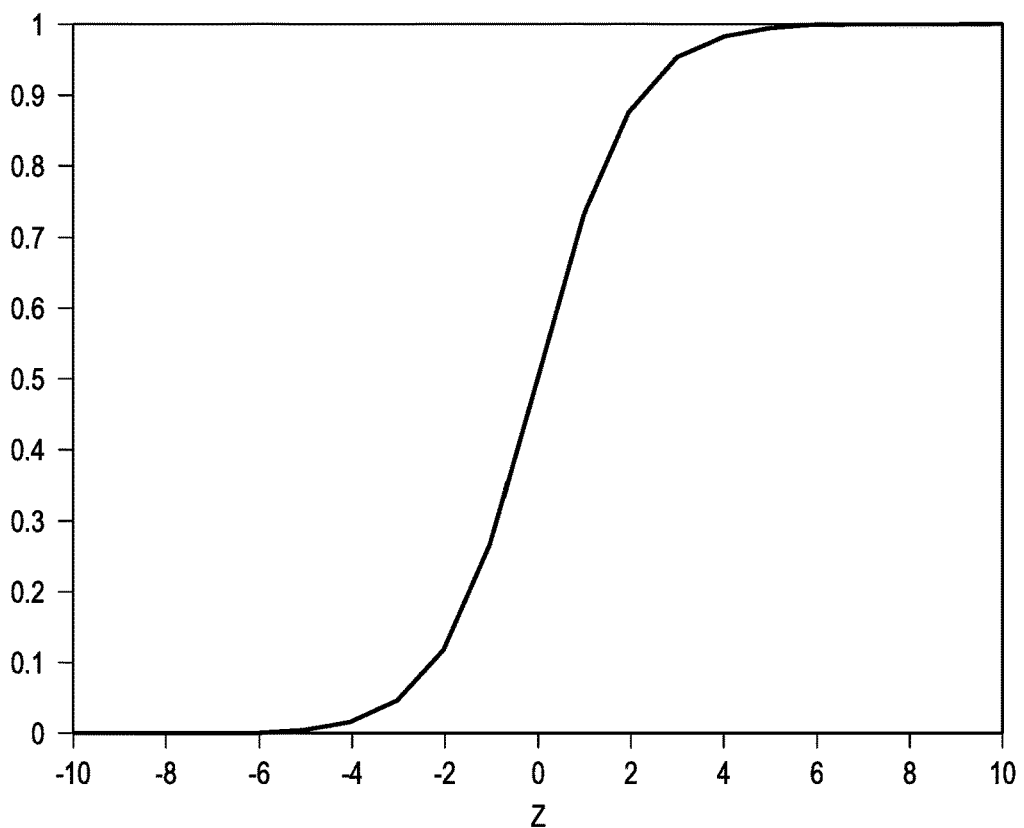
FIG. 3B illustrates an example function for generating BLUT increase scale values.

For example, the BLUT increase scale ($\beta$) may be given based on a sigmoid function as illustrated in FIG. 3B using the ratio (z) of BA-to-NBA sizes, as follows:

$$\beta(z) = \frac{1}{1 + e^{-z}} \quad (8)$$

Figure 3C:
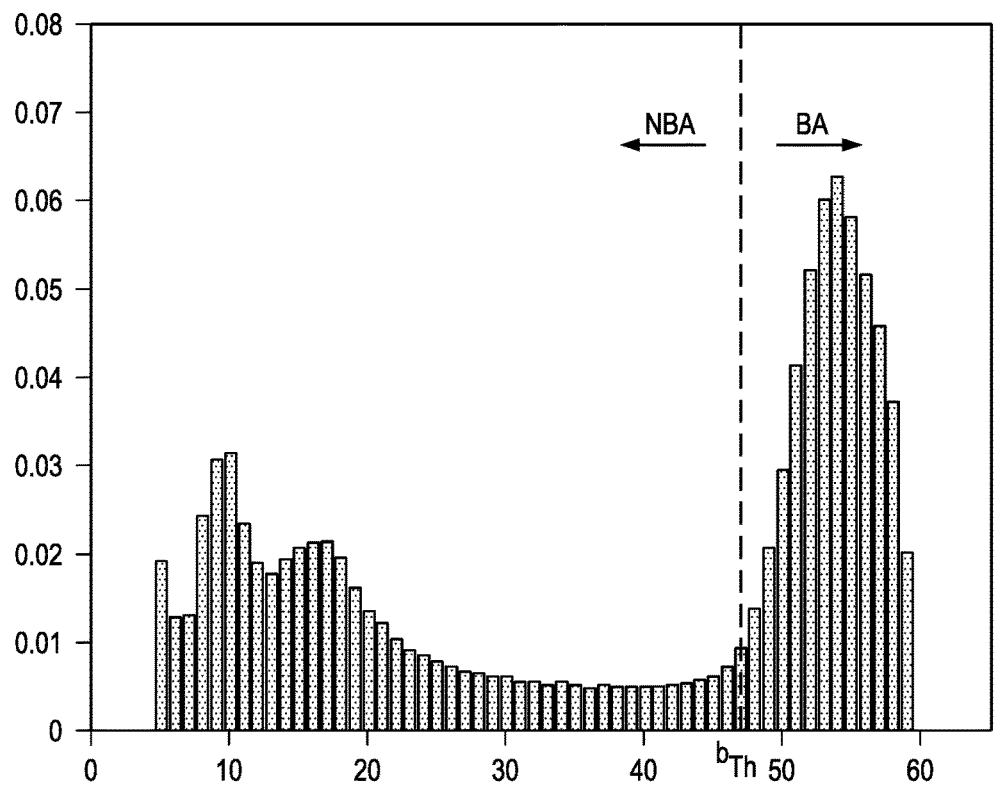
FIG. 3C illustrates an example SDR luma histogram.

FIG. 3C illustrates an example SDR luma histogram with a BA/NBA split separating BA luma bins from NBA luma bins. A BLUT increase scale ($\beta$) (e.g., $\beta$=0.7521, etc.) for this SDR luma histogram or an underlying SDR image may be determined using a ratio (z) of BA-to-NBA sizes computed from the SDR luma histogram and expression (8) above.

Iterative BLUT Modification

Figure 2C:
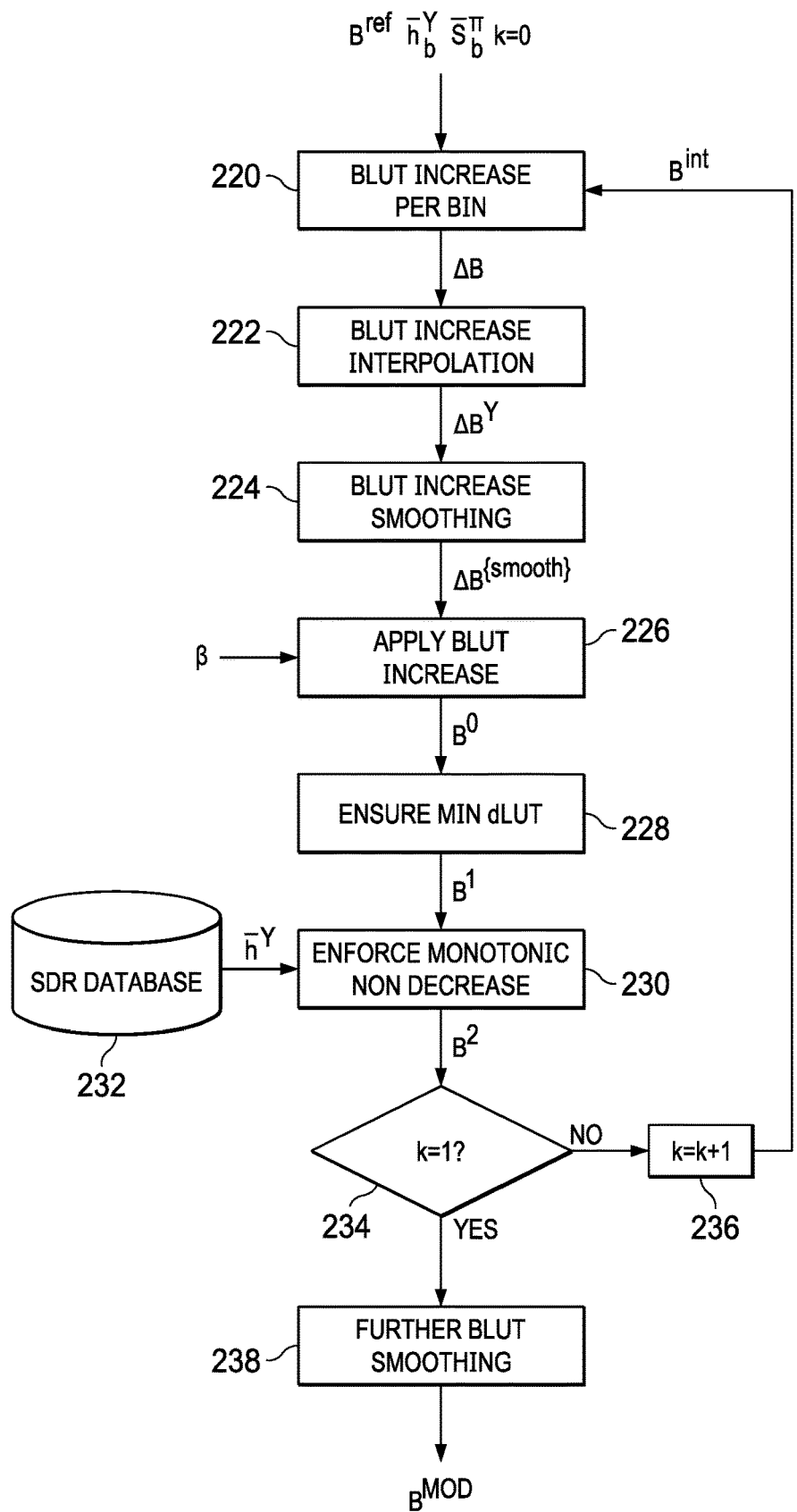

FIG. 2C illustrates—as compared with FIG. 2B, a more detailed version of—example processing blocks for generating BLUT modifications that preserve colors or appearances (relative to source SDR images) in color-rich regions or NBAs of reconstructed HDR images. The processing blocks as illustrated may be implemented or performed by one or more computing devices such as an encoder, a decoder, a transcoder, etc. The BLUT modifications generated by the processing blocks of FIG. 2C can alter or modify a given reference (or current) BLUT (denoted as $B^{ref}$) for each luma range corresponding to each histogram bin of NBAs. Some or all of the processing blocks may be executed iteratively, recursively, repeatedly, etc., to improve color preservation results in color rich regions of images. In a non-limiting implementation example, an iteration variable k (e.g., with a value of one (1) to allow two iterations, etc.) may be used to control the number of iterations.

Note that BLUT modification conceptually may or may not have a simple and straight-forward closed-form solution. As the BLUT is modified, BA HDR luminance values may change, possibly causing NBA color appearance loss even after the BLUT modification. In addition, the final BA HDR luminance values, which is an input to a color preservation mapping function as described herein, may not be ideally or precisely estimated until the final modified BLUT is available. To tackle this chicken-and-egg problem, some or all of the BLUT modification operations can be repeated in multiple iterations. By way of example but not limitation, two iterations may be used. The first iteration constructs an intermediate BLUT, which is used to obtain inputs to be used in the second iteration. In some operational scenarios, only two iterations are used to minimize computations while ensuring or achieving a reasonable outcome. In some other operational scenarios, a single iteration or more than two iterations may also be used.

In some operational scenarios, NBA/BA separation thresholds such as the threshold codeword $s_{Th}^Y$ and the threshold bin index $b_{Th}$ may be computed initially once using $\psi_{Th}$ and $B^{ref}$ and may thereafter remain constant computed initially. These thresholds may not be computed in the second iteration, for example using the intermediate BLUT after the first iteration, in order to save computations. In some other operational scenarios, the NBA/BA separation thresholds such as the threshold codeword $s_{Th}^Y$ and the threshold bin index $b_{Th}$ may be computed more than once, for example using modified BLUTs generated with already finished iteration(s).

Block 220 comprises receiving an initial value (e.g., 0, etc.) of an iteration variable (k), a reference (e.g., an initial, etc.) luma BLUT ($B^{ref}$), a representative (e.g., average, etc.) chroma saturation value $\bar{s}_b^\pi$ in each luma histogram bin, a normalized luma histogram $\bar{h}_b^s$ in each luma histogram bin, etc. In each iteration of BLUT modification, block 220 also comprises estimating a BLUT increase (denoted as $\Delta B$) per SDR luma bin in an SDR histogram bin generated from an input source SDR image.

A BLUT increase for each SDR histogram bin that falls within a specific luma codeword space (e.g., comprising available SDR codewords for coding input source SDR images, SMPTE codeword range, etc.). For any bins outside the specific luma codeword space such as the SMPTE range, the BLUT increase may be assumed to be zero (0). The BLUT increase is the difference between a target HDR luminance value and an (input) HDR luminance generated based on a luma BLUT to be modified for color preservation.

The target HDR luminance may be estimated for each SDR luminance bin within the specific luma codeword space such as the SMPTE range based on an estimation function such as a color preservation mapping function generated based on a regression model as previously discussed.

Initially, each SDR luminance bin within the entire specific luma codeword space may be considered to be NBA and eligible for BLUT increase. This means that an SDR luminance bin, even with a bin index above the threshold bin index $b_{Th}$ that separates NBA bins and BA bins, is considered for BLUT increase in block 220. The reason is that if only SDR luminance bins with bin indexes below $b_{Th}$ were considered as NBA, then the luma BLUT might be increased only for those bins and the luma BLUT bins with bin indexes $b \geq b_{Th}$ would not have any BLUT increase, resulting in a discontinuity problem that disrupts an otherwise visually continuous spatial area (e.g. a depicted object such as a car, etc.) that has pixels distributed in bins just above and below $b_{Th}$. In other words, increasing HDR luminance only for bins $b<b_{Th}$ may be prone to causing visually unpleasing "splitting" of an otherwise continuous spatial area in a reconstructed HDR image.

Figure 3D:
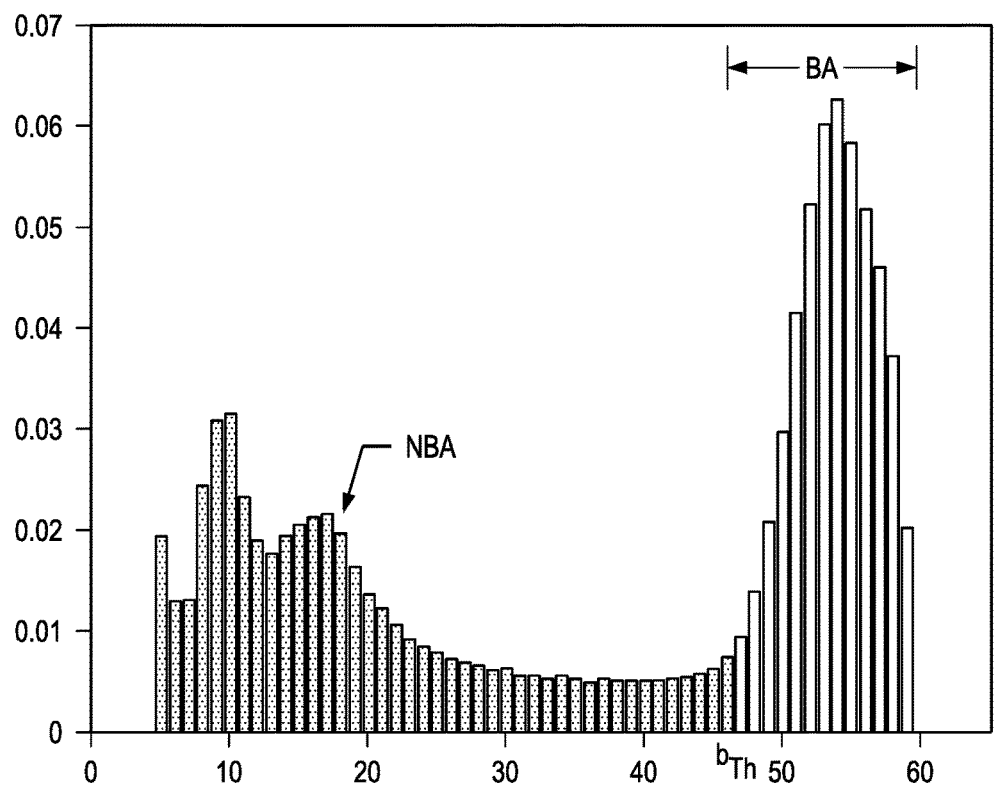
FIG. 3D and FIG. 3E illustrate example bright areas for SDR luma histogram bins.

FIG. 3D illustrates an example BA for any SDR luma histogram bin with its bin index less than the NBA-BA threshold bin index $b_{Th}$. In some operational scenarios, for each SDR luma histogram bin such that its bin index $b<b_{Th}$, all SDR luma histogram bins (or significant pixels therein) equal or above $b_{Th}$ are used to compute or estimate (the size of) BA. The size of BA may be computed or estimated in a straightforward way, as the the size of BA is fixed or invariant for all SDR luma histogram bins with their bin indexes below $b_{Th}$.

For example, for a first SDR luma histogram bin (e.g., indicated as an "NBA" bin in FIG. 3D, etc.) having a first bin index below 20 (along the horizontal axis), the size of BA is computed or estimated with all the bins with bin indexes no less than $b_{Th}$ (which is slightly below 50 in the present example). Similarly, for a second SDR luma histogram bin having a second bin index below 40, the size of BA is computed or estimated with all the same bins with bin indexes no less than $b_{Th}$. Thus, for both the first and second SDR luma histogram bins, the size of BA is the same.

Figure 3E:
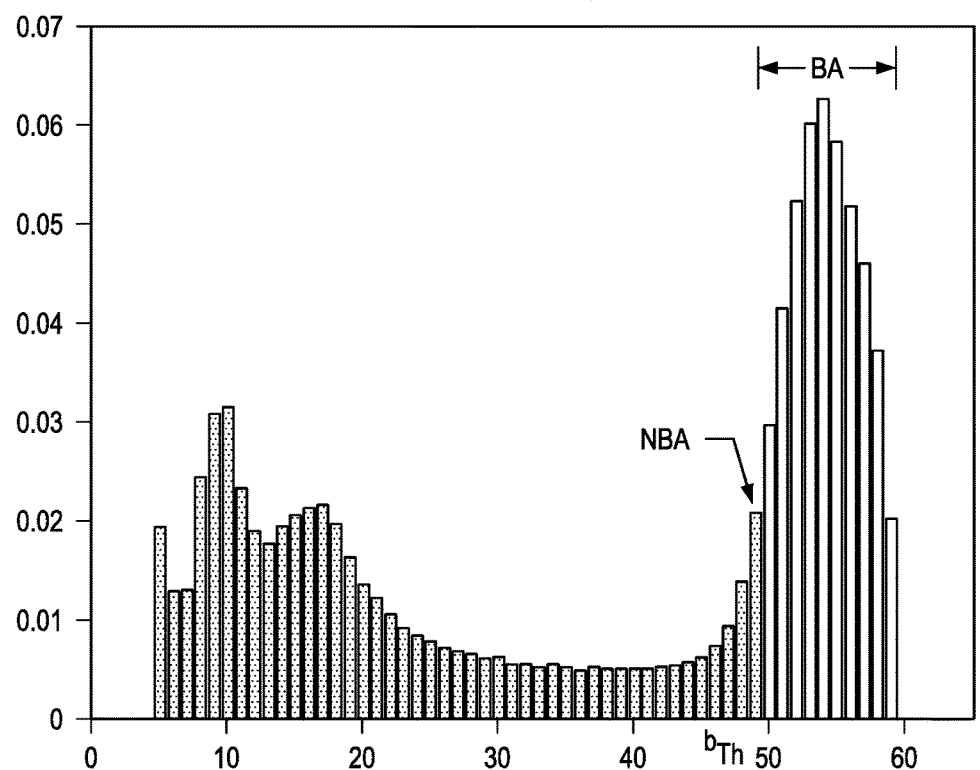

FIG. 3E illustrates an example BA for any SDR luma histogram bin with its bin index no less than the NBA-BA threshold bin index $b_{Th}$. For each SDR luma histogram bin with its bin index $b \geq b_{Th}$, (the size of) a BA—used in part to determine a respective BLUT increase for each such bin—is computed or estimated using all SDR luma histogram bins that have their bin indexes greater than b, (instead of greater than $b_{Th}$). Therefore, for each such bin with its bin index $b \geq b_{Th}$, (the size of) a BA is not fixed and is computed to different values.

To obtain a BLUT increase for each b-th bin, the following quantities may be first determined:

$v_b^{Y\{NBA\}}$: NBA's HDR luminance value in the b-th bin,
$v_b^{\pi\{NBA\}}$: NBA's HDR color saturation value in the b-th bin, and
$v_b^{Y\{BA\}}$: Corresponding BA's HDR luminance value for the b-th bin.

Let $s_{mid}^{y(b)}$ be the SDR codeword at the center of the b-th luma histogram bin (it should be noted that in various embodiments, other possible representative locations instead of the center in the bin may also be used). If the bin contains even number of codewords, (e.g., two, etc.) SDR codewords closest to the center may be averaged and rounded to an (e.g., integer, etc.) average SDR codeword for the midpoint or center of the bin.

The reference BLUT $B^{ref}$ can be a non-monotonically decreasing function designed for a specific maximum (e.g., threshold, etc.) luminance value denoted as $T_{max}$. Examples of the maximum luminance value for the reference BLUT $B^{ref}$ may include, are not necessarily limited to only, any of 100, 200, . . . 6000, or more. Additionally, optionally or alternatively, the reference BLUT $B^{ref}$ may be generated based on a static function that is unchanged for SDR images, or a dynamic function that is adaptive to the specific content of a SDR image to which the reference BLUT is to be applied.

An NBA HDR luminance value (denoted as $v_b^{Y\{NBA\}}$), to which the b-th SDR luma histogram bin is mapped based on the reference BLUT $B^{ref}$, may be determined as follows:

$$v_b^{Y\{NBA\}} = B^{ref}(s_{mid}^{y(b)}) \quad (9)$$

A representative (e.g., average, etc.) SDR color saturation value $\bar{s}_b^{\pi}$ in the b-th SDR luma histogram bin can be determined using express (5) above. Then, an NBA HDR color saturation value (denoted as $v_b^{\pi\{NBA\}}$), to which the representative (e.g., average, etc.) SDR color saturation value $\bar{s}_b^{\pi}$ in the b-th SDR luma histogram bin is mapped, may be determined based on luma modulated polynomial function $\alpha^T$, as follows:

$$v_b^{\pi\{NBA\}} = \alpha^T(s_{mid}^{y(b)}) \cdot \max(\bar{s}_b^{\pi}, 0.05) \quad (10)$$

where $\max(\cdot)$ denotes a function that selects the larger of the arguments to the function, and the value of "0.05" represents an example floor value (which may be configured by a user, determined or estimated empirically, etc.) for chroma saturation.

In some operational scenarios, the luma modulated polynomial function $\alpha^T$ can be determined empirically by using a population of training SDR-HDR image pairs. This polynomial function can be used to provide a slope at a particular SDR luma codeword value for a functional relationship (e.g., a simplified linear relationship, a non-linear relationship, a relationship obtained with a regression model based on data points collected for SDR saturation values in SDR images and HDR saturation values in corresponding HDR images, etc.) used to maps SDR saturation values to HDR saturation values. The luma modulated polynomial function $\alpha^T$ can be determined or estimated using the population of training SDR-HDR image pairs to obtain SDR saturation values (as represented in SDR images) and HDR saturation values (as represented in HDR images corresponding to the SDR images) corresponding to the SDR saturation values.

A BA HDR luminance value (denoted as $v_b^{Y\{BA\}}$) corresponding to the b-th SDR luma histogram bin may be obtained based on a BA luma BLUT (denoted as $B^{BA}$) as follows for each iteration (as indicated by the iteration variable k). For the first (or initial) iteration with the iteration variable $k=0$, $B^{BA}=B^{ref}$. For the second iteration with the iteration variable $k=1$, $B^{BA}=B^{int}$, where $B^{int}$ is an intermediate luma BLUT representing the (final output) modified luma BLUT from the first iteration. In the present example, only two iterations ($k=0, 1$) are used. If more or fewer iterations are used, then more or fewer BA luma BLUT may be defined in a similar manner.

Let $b^{BA,l}$ be the lowest bin index among all the SDR luma histogram bins constituting the BA for the b-th SDR luma histogram bin, which may be determined as follows:

$$b^{BA,l} = \max(b_{Th}, b+1) \quad (11)$$

A representative (e.g., average, etc.) SDR luminance value of the BA for the b-th SDR luma histogram bin may be determined as follows:

$$s_b^{Y\{BA\}} = \frac{\sum_{j=b^{BA,l}}^{N-1} s_{mid}^{y(j)} \cdot \bar{h}_j^s}{\sum_{j=b^{BA,l}}^{N-1} \bar{h}_j^s} \quad (12)$$

The BA HDR luminance value may be determined as follows:

$$v_b^{Y\{BA\}} = B^{BA}(s_b^{Y\{BA\}}) \quad (13)$$

After the quantities: $v_b^{Y\{BA\}}$, $v_b^{Y\{NBA\}}$ and $v_b^{\pi\{NBA\}}$ are computed or determined for the b-th SDR luma histogram bin, the vector $\varphi_b$ in expression (3) above may be constructed for the b-th SDR luma histogram bin. A target NBA luminance value (denoted as $\hat{v}_{req,b}^{Y\{NBA\}}$) for the b-th SDR luma histogram bin, which is color compensated, may be determined as follows:

$$\hat{v}_{req,b}^{Y\{NBA\}} = \omega^T \cdot \varphi_b \quad (14)$$

The BLUT increase $\Delta B_b$ for the b-th bin may be computed as follows:

$$\Delta B_b = \frac{\bar{s}_b^\pi}{\max(\bar{s}_b^\pi, 0.05)} \cdot \left(\hat{v}_{req,b}^{Y\{NBA\}} - v_b^{Y\{NBA\}}\right) \quad (15)$$

A scale, $\bar{s}_b^\pi/\max(\bar{s}_b^\pi, 0.05)$ in expression (15) above, may be used to gradually reduce the extent or effect of BLUT increase as the chroma saturation values $\bar{s}_b^\pi$ gradually decrease below a floor value of 0.05, for which a desaturation may not (e.g., generally, etc.) be needed.

In some operational scenarios, a BLUT increase of 0 (or no BLUT increase) is not allowed for any bin within the specific SDR codeword space such as the SMPTE range so long as there are some bins having non-zero BLUT increases. A linear interpolation may be applied on BLUT increases across all bins within the specific SDR codeword space such as the SMPTE range. This can be used to avoid irregularities and maintain (e.g., minimum, etc.) smoothness in a final reconstructed or modified luma BLUT. Otherwise, the final luma BLUT may be relatively difficult for a set of polynomials (e.g., 8-piece polynomial representation in image metadata, etc.) or may be relatively prone to resulting in awkward looking NBAs in a resulting HDR image generated based on the final reconstructed or modified luma BLUT or the set of polynomials.

Let $\Delta B^Y$ ($s^y$) be the BLUT increase in HDR codeword space (or domain). A BLUT increase for each bin may be assigned to the SDR codewords located at the center of that bin, as follows:

$$\Delta B^Y(s_{mid}^{y(b)}) = \Delta B_b \quad (16)$$

An example procedure for determining a BLUT increase for the codeword at the center of SDR luma histogram bins is illustrated in TABLE 3 below.

TABLE 3

// set BLUT for computing BA luminance
if first iteration,
  $B^{BA} = B^{ref}$
else
  $B^{BA} = B^{int}$
// initialize the BLUT increase per bin
for (b =0; b < N ; b ++)
  $\Delta B_b = 0$
end
// BLUT increase at the bins' centers
for (b=SMPTE min bin; b < SMPTE max bin; b ++)
  // BA's luminance
  $b^{BA,l} = \max(b_{Th}, b+1)$
  if ( $h_j^s = 0$ for $\forall j \in [b^{BA,l}, N)$ )
    // BA size is 0
    continue
  end $$s_b^{Y\{BA\}} = \frac{\sum_{j=b^{BA,l}}^{N-1} s_{mid}^{y(j)} \cdot \bar{h}_j^s}{\sum_{j=b^{BA,l}}^{N-1} \bar{h}_j^s} \quad \text{// average SDR value in BA}$$

$v_b^{Y\{BA\}} = B^{BA}(s_b^{Y\{BA\}})$
// NBA's luminance
if ($h_b^s = 0$)

TABLE 3-continued

// NBA's size is 0
  continue
end
$v_b^{Y\{NBA\}} = B^{ref}(s_{mid}^{y(b)})$
// NBA's saturation
$v_b^{\pi\{NBA\}} = \alpha^T (s_{mid}^{y(b)}) \cdot \max(\bar{s}_b^\pi, 0.05)$ // $\bar{s}_b^\pi$ is the average saturation at the $b^{th}$ bin
// NBA's required HDR luminance in b'th bin
$\hat{v}_{req,b}^{Y\{NBA\}} = \omega^T \cdot \varphi_b$
$\hat{v}_{req,b}^{Y\{NBA\}} = \min(\max(\hat{v}_{req,b}^{Y\{NBA\}}, 0), 1)$ // clip outside (0,1)
// BLUT increase for the bin's center $$\Delta B_b = \frac{\bar{s}_b^\pi}{\max(\bar{s}_b^\pi, 0.05)} \cdot \left(\hat{v}_{req,b}^{Y\{NBA\}} - v_b^{Y\{NBA\}}\right),$$

end
// Apply linear interpolation to avoid $\Delta B_b$ =0 within the SMPTE range
for (b =SMPTE min bin; b < SMPTE max bin; b ++)
  if $\Delta B_b = 0$ $$b^u = \arg\min_j \{j > b \text{ and } \Delta B_j \neq 0\}$$

$$\Delta B_b = \Delta B_{b-1} + \frac{(\Delta B_{b^u} - \Delta B_{b-1})}{b^u - (b-1)}$$

end
end
// Set the BLUT increase into the SDR codeword
for (b=0; b < N; b ++)
  $\Delta B^Y (s_{mid}^{y(b)}) = \Delta B_b$
End Block 222 comprises interpolating per-bin BLUT increases ($\Delta B$ or $\Delta B_b$) to result in or produce a BLUT increase (denoted as $\Delta B^Y$) for each SDR codeword.

The BLUT increases, $\Delta B_b$, as estimated in block 220 are (e.g., only, etc.) for the SDR codewords at the centers of the SDR histogram bins. The BLUT increases at the centers can be used in nearest neighbor interpolation or repeated to derive BLUT increases for the rest of SDR codewords within an SDR histogram bin. As a result, BLUT increases for all SDR codewords in each (e.g., b-th, etc.) SDR histogram bin can be derived, as follows:

$$\Delta B^Y(s) = \Delta B_b \forall s \in b^{th} \text{bin} \quad (17)$$

Figure 3F:
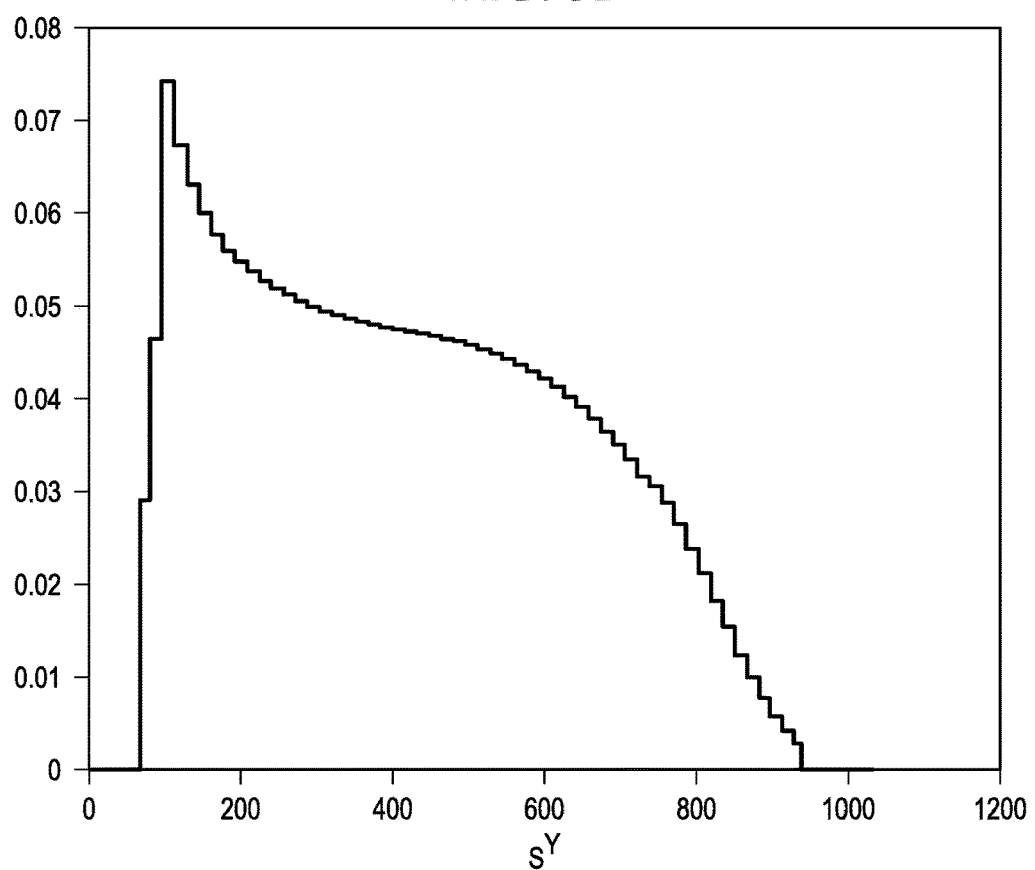
FIG. 3F illustrates example luminance increases for color preservation.

FIG. 3F illustrates example interpolated and expanded (or repeated) BLUT increases for all SDR codewords in each of all SDR histogram bins. The staircase shaped curve indicates that a BLUT increase at a bin center can be copied or repeated to all codewords in that bin.

Block 224 comprises smoothing per codeword BLUT increase $\Delta B^Y$ (or $\Delta B^Y(s)$) to generate a smoothened BLUT increase (denoted as $\Delta B^{\{smooth\}}$) for each SDR codeword.

The BLUT increase for each SDR codeword, $\Delta B^Y$, may still cause irregularities in BLUT even after dips at 0s are avoided. To avoid irregularities further, a smoothing filter may be applied to $\Delta B^Y$. However, smoothing alone may result in BLUT increase values less than actually needed (or acceptable) BLUT increases in some SDR luma histogram bins for color preservation, as the filtered BLUT increases for these bins may not be sufficient to preserve rich colors in NBAs and prevent color desaturation in these areas/regions of a reconstructed HDR image.

Figure 3G:
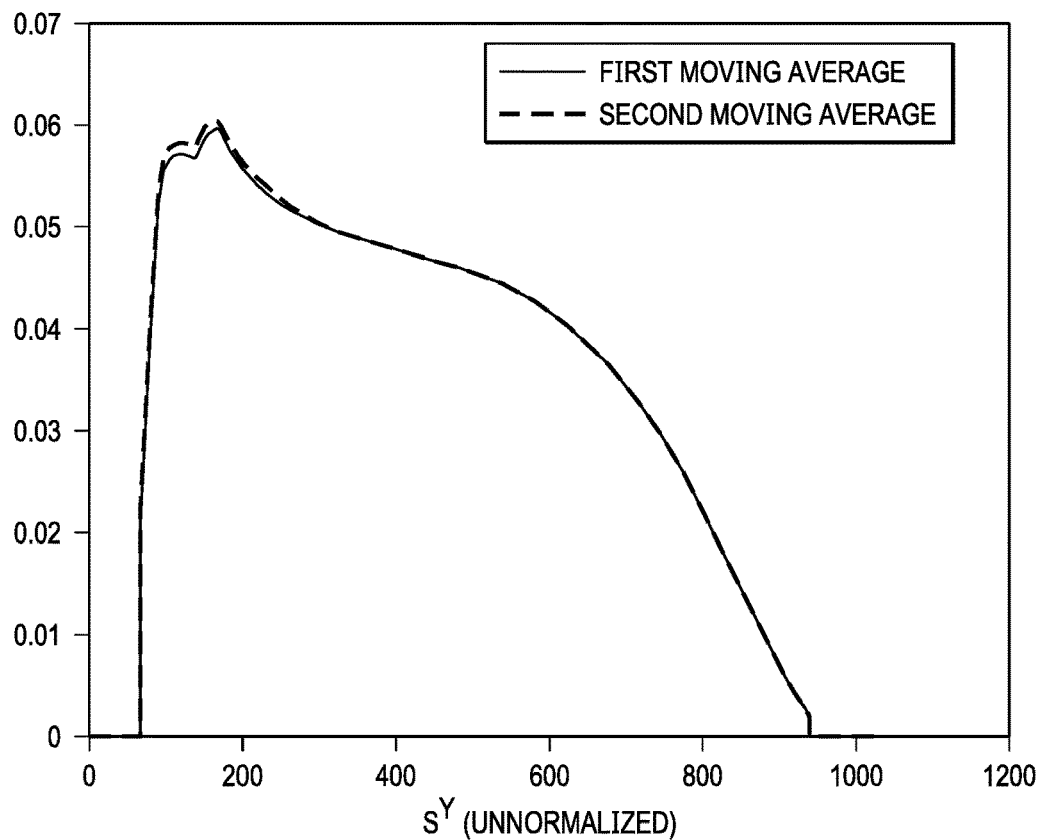
FIG. 3G and FIG. 3H illustrate example luminance backward reshaping curves for color preservation.

In some operational scenarios, a maximum or (maximization) operation is performed to select the maximum value between a pre-smoothened value (as illustrated in FIG. 3F) and a smoothened value. This ensures that at least the BLUT increase value as estimated by the color preservation mapping function (or a corresponding regression model) is maintained in each SDR luma histogram bin. As a result, BLUT increase values at the corners of the staircase-like curve of FIG. 3F is preserved in BLUT increase values of a smoothened BLUT increase curve as illustrated in FIG. 3G, the latter of which is generated from the former through the smoothing and maximization operations. One benefit from these operations is that pixels lying in those luminance areas at staircase corners of FIG. 3F are protected by the smoothened BLUT increase curve of FIG. 3G from becoming desaturated.

The smooth range, m, may be set to a relatively large number to avoid some extreme irregularities. An example value may, but is not necessarily limited to only, be given (e.g., analytically, empirically, programmatically, etc.) as follows:

$$m = 2 \cdot 18 \cdot 2^{N_B - 8} + 1 \tag{18}$$

where $N_B$ represents the bit depth of the input source SDR image or a SDR signal encoded with input source SDR images including the input source SDR image. Example values of $N_B$ may be, but are not necessarily limited to only, 8 or 10 bits. In an example, for 10 bit SDR images, the smooth range may be 145.

In some operational scenarios, for each SDR codeword $s^Y$, the lower and upper bound of the moving average for the codeword, $s^Y$, may be set as follows:

$$s^{Y,u} = \min(s^Y + n, s_{max}^Y + 1)$$

$$s^{Y,l} = \max(s^Y - n, s_{min}^Y - 1)$$

$$n = \lfloor m/2 \rfloor. \tag{19}$$

A first moving average operation may be applied to the BLUT increases for each SDR luma codeword, $\Delta B^Y$, as represented in FIG. 3F, as follows:

$$\Delta B'(s^Y) = \frac{1}{(s^{Y,u} - s^{Y,l} + 1)} \sum_{i=s^{Y,l}}^{s^{Y,u}} \Delta B^Y(i) \tag{20}$$

To preserve BLUT increases for HDR codewords as much as possible, a maximum (or maximization) operation between a pre-smoothened $\Delta B^Y$ and the output or the left hand side (LHS) of expression (20) above may be performed next, as follows:

$$\Delta \tilde{B}(s^Y) = \max(\Delta B^Y(s^Y), \Delta B'(s^Y)) \tag{21}$$

A second moving average operation may be applied to the output or the left hand side (LHS) of expression (21) above, as follows:

$$\Delta B^{\{smooth\}}(s^Y) = \frac{1}{(s^{Y,u} - s^{Y,l} + 1)} \sum_{i=s^{Y,l}}^{s^{Y,u}} \Delta \tilde{B}(i) \tag{22}$$

FIG. 3G illustrates a smoothened BLUT increase curve after applying the operations of expressions (20) through (22) above. As compared with another smoothened BLUT increase curve after the first moving average operation, the smoothened BLUT increase curve after applying the operations of expressions (20) through (22) has a higher HDR intensity for some codewords because of the maximum (or maximization) operation.

Block 226 comprises applying a BLUT increase scale (β) to a per codeword (smoothened) BLUT increase $\Delta B^{\{smooth\}}$ (or $\Delta B^{\{smooth\}}(s^Y)$) to generate a corresponding scaled per codeword (smoothened) BLUT increase. The BLUT increase scale (β) allows BLUT increases or a reconstructed luma BLUT to take into consideration relative sizes of BAs and NBAs in the input source SDR image. Scaled per codeword (smoothened) BLUT increases are then used to construct a new BLUT (denoted as $B^0$), as follows:

$$B^0(s^Y) = B^{ref}(s^Y) + c \cdot \beta \cdot \Delta B^{\{smooth\}}(s^Y) \tag{23}$$

wherein c denotes a multiplier constant that may be used to further increase performance for color preservation. An example value of the multiplier constant may, but is not necessarily limited to only, 1.3. Such a value may be designed or configured by a designated user, a human expert, determined empirically (e.g., subjective perceptual experiment, based at least in part on AI, ML, etc.) or programmatically.

Block 228 comprises ensuring a minimum differential LUT (denoted as dLUT) to be used in per codeword BLUT increases in the new BLUT (the new BLUT ensured with the minimum dLUT is denoted as $B^1$). Ensuring or enforcing the minimum differential LUT (dLUT) can be used to avoid clipping as well as better preserving the HDR look (e.g., more dynamic and higher contrast than the SDR look of the input source SDR image, etc.) of the reconstructed HDR image derived from the input source SDR image.

More specifically, as a luma BLUT's output is (e.g., always, entirely, saliently, etc.) limited within a specific HDR codeword space (or range), a modified BLUT after adding BLUT increases as described herein is going to be closer to a convex hull shape than the reference (in the first iteration) or intermediate BLUT (in the second iteration) before adding the BLUT increases. This may cause differential LUTs (e.g., $1^{st}$ order derivative or $1^{st}$ order differential, etc.), denoted as dLUT, to be mostly lower than that of the reference or intermediate BLUT. The decrease of dLUT in the modified BLUT would likely reduce contrasts or image details, especially in high tone or highlight regions of a reconstructed HDR image derived from the input source SDR image based on such modified BLUT.

To avoid the possible loss of contrasts or details in the BAs, the minimum dLUT, ε=0.00025, may be enforced. It should be noted that the example normalized value of the minimum dLUT is for illustration purposes only. Such a value may be designed or configured by a designated user, a human expert, determined empirically (e.g., subjective perceptual experiment, based at least in part on AI, ML, etc.) or programmatically.

In some operational scenarios, for any SDR luma codeword at which a BLUT (or HDR luminance value) differential, dLUT, is less than the minimum dLUT ε, the dLUT is replaced with the minimum dLUT ε.

An example procedure for ensuring the minimum dLUT for SDR luma codewords with the SDR luma codeword space such as the SMPTE range is illustrated as follows.

The dLUT (e.g., $1^{st}$ order derivative, $1^{st}$ order differential, etc.) for the BLUT $B^0$ may be obtained the BLUT $B^0$ from within the SMPTE range, as follows (note the dLUT is zero outside the range):

$$dB^0(s^Y) = B^0(s^Y) - B^0\left(s^Y - \left(\frac{1}{2^{N_B}}\right)\right) \tag{24}$$

To ensure the minimum dLUT, set $dB^1(s^Y) = \varepsilon$ for any SDR luma codewords at which differentials $dB^1(s^Y) < \varepsilon$.

Increasing the differentials dLUT at some SDR luma codewords to the minimum dLUT ε from lower differential values may mean that the resultant maximum HDR codeword, $B^1(1)=\Sigma dB^1(s^Y)$, can go beyond the target maximum HDR luminance value available or supported by the target HDR luminance range.

In some operational scenarios, differentials dLUT for other SDR luma codewords are reduced so that the resultant maximum HDR codeword remains the same as the maximum HDR codeword as if the minimum dLUT were not ensured or enforced, as follows.

$$\text{if } dB^0(s^Y) \geq \varepsilon, \text{ then} \tag{25-1}$$
$$dB^1(s^Y) = dB^0(s^Y) - \frac{K}{T}(dB^0(s^Y) - \varepsilon) \text{ where}$$

$$K = \sum (\varepsilon - dB^0(s^Y)) \text{ for } dB^0(s^Y) < \varepsilon \tag{25-2}$$

$$T = \sum (dB^0(s^Y) - \varepsilon) \text{ for } dB^0(s^Y) \geq \varepsilon \tag{25-3}$$

Now, if K>T then expression (25-1) may yield a negative dLUT for the LHS, which means that $B^0$ does not have enough SDR luma codewords that provide adjustments or reduction for the purpose of maintaining the same target HDR luminance value. When this occurs, in some operational scenarios, the minimum dLUT is reduced to solve the problem.

For example, if it is determined that K>T, then reduce the minimum dLUT by setting ε=0.9·ε and repeating the adjustment operation in expression (25-1). Otherwise, if it is determined that K≤T, then proceed to generate an output BLUT $B^1(s^Y)$ as follows:

$$B^1(s^Y) = B^1\left(s^Y - \left(\frac{1}{2^{N_B}}\right)\right) + dB^1(s^Y) \tag{26}$$

The foregoing operations can be performed to ensure the maximum HDR codeword as represented in $B^0(s^Y)$ is not changed in $B^1(s^Y)$. More specifically, the sum of dLUTs for the increased codeword is given as follows:

$$\Sigma dB^1(s^Y)=\Sigma dB^0(s^Y)+\Sigma(\varepsilon-dB^0(s^Y))=\Sigma dB^0(s^Y)+K \tag{27}$$

Since $dB^1(s^Y)=dB^0(s^Y)+(\varepsilon-dB^0(s^Y))=\varepsilon$, the sum for the decreased codewords (at which dLUTs are decreased) is given as follows:

$$\sum dB^1(s^Y) = \sum dB^0(s^Y) - \frac{K}{T}\sum(dB^0(s^Y) - \varepsilon) = \tag{28}$$
$$\sum dB^0(s^Y) - \frac{K}{T}T = \sum dB^0(s^Y) - K$$

Therefore, the overall sum of new differential values dLUT in $B^1(s^Y)$ is the same as that of differential values in $B^0(s^Y)$, as follows:

$$\Sigma dB^1(s^Y)=(\Sigma dB^0(s^Y)-K)+(\Sigma dB^0(s^Y)+K)=\Sigma dB^0(s^Y) \tag{29}$$

Block 230 comprises enforcing a monotonically non-decreasing condition on the new BLUT (the new BLUT enforced with the monotonically non-decreasing condition is denoted as $B^2$) to make sure backward reshaping is well defined and well behaved. For example, the monotonically non-decreasing condition can be used or implemented in the new BLUT ($B^2$) to avoid mapping a low SDR codeword to an HDR codeword higher than another HDR codeword mapped from an SDR codeword higher than the low SDR codeword.

Cumulative density function (CDF) matching operations may be applied to ensure that the new BLUT ($B^2$) satisfies the monotonically non-decreasing condition in an HDR codeword space such as a normalized (e.g., SMPTE, etc.) range between (0,1). In some operational scenarios, one or more CDFs can be constructed using SDR histogram(s) of training images in SDR training dataset (232), instead of the input source SDR image, for example to avoid overfitting. From the SDR histogram(s) denoted as $\bar{h}^s(\ )$, HDR histogram (s) $\bar{h}^v(\ )$ can be constructed. Example CDF matching operations and HDR histogram constructions are described in the U.S. Provisional Patent Application No. 62/520,832 and U.S. Provisional Patent Application No. 62/781,185.

At the end of the first iteration of BLUT modification, instead of using $B^{ref}$ as the input luma BLUT to be modified, $B^{int}=B^2$ may be used as the input luma BLUT to be modified in the second iteration. For the second iteration (or subsequent iteration), the process flow can go back to block 220.

Figure 3H:
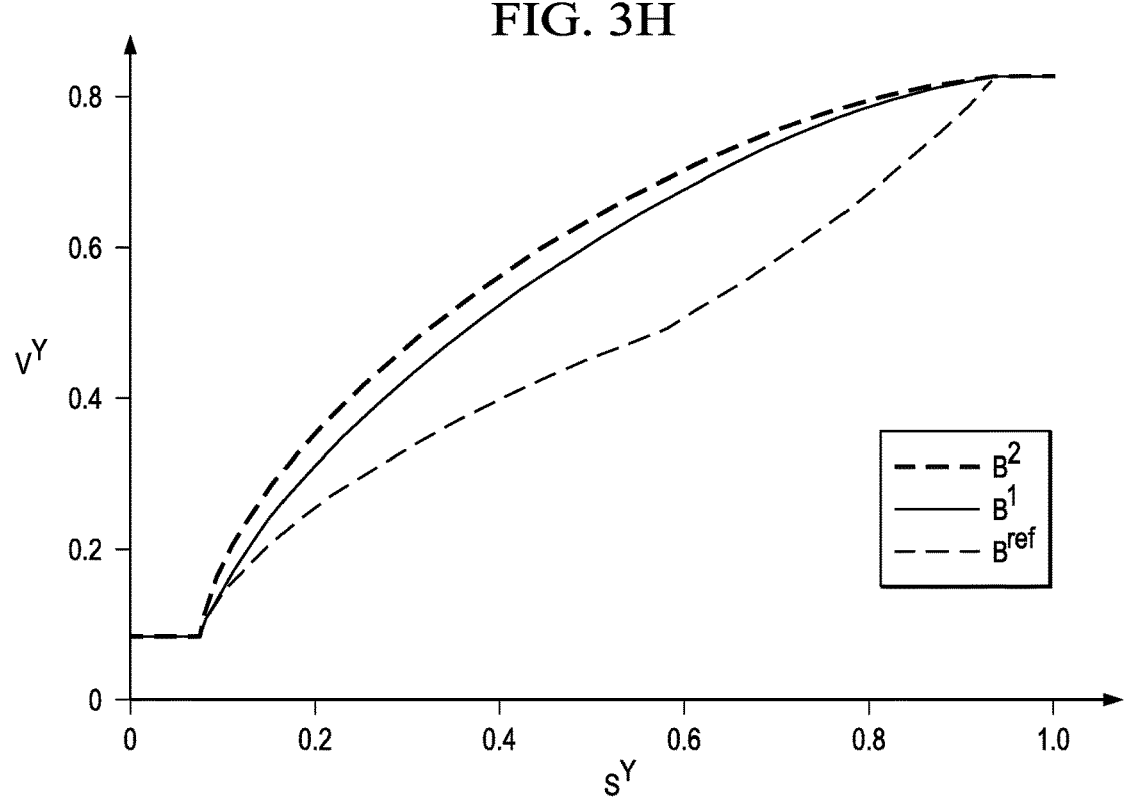

FIG. 3H shows an example of a BLUT $B^2$ generated in the second iteration and an intermediate $B^{int}$ generated at the end of the first iteration, as compared with the reference (or initial) BLUT $B^{ref}$. Luma BLUTs in subsequent iteration(s) may cause BLUT increases in the NBAs to be larger than previous or input BLUT(s). Colors in the NBAs can be better preserved, especially for the low to mid tone regions of the input source SDR image. As illustrated in FIG. 3H, increases in BLUTs in subsequent iteration(s) may be smaller than those in previous iteration(s), indicating that two iterations are sufficient for color preservation in many operational scenarios and that further iterations may only add a relatively tiny incremental improvement which may or may not be justified for added computational costs and associated latencies.

As discussed previously, in some operational scenarios, processing blocks 220 through 230 may be repeatedly run in multiple iterations. Block 234 comprises determining whether the iteration variable (k) has reached a maximum iteration value (e.g., one (1) in the present example, etc.).

In response to determining that the iteration variable (k) has not reached the maximum iteration value, block 236 incrementing the iteration variable (k) by one (1). The processing flow goes back to block 220.

On the other hand, in response to determining that the iteration variable (k) has reached the maximum iteration value, block 238 comprises further smoothing the new BLUT (the further smoothened new BLUT is denoted as $B^{MOD}$).

The extra or further smoothing is applied to the new BLUT generated from the iteration(s) to avoid insistencies between or among BLUTs applied to consecutive input source SDR images (e.g., encoded in an input SDR signal, etc.) to construct consecutive reconstructed HDR images (e.g., a corresponding HDR signal for rendering or for display mapping, etc.).

In some operational scenarios, the output luma BLUT from the process flow of FIG. 2C is to be approximated by a set of polynomials such as a set of eight piecewise polynomials subject to the extra or further temporal smoothing. Without this extra or further smoothing, the set of polynomials may fluctuate between or among consecutive images and cause slight inconsistencies that result in visibly perceptible flickering in the time sequence of reconstructed HDR images.

A smooth filter type and a smooth range for the extra smoothing may be similar to those used in the BLUT increase smooth operations discussed above in connection with block 224. The (e.g., only, etc.) difference is that the maximum (or maximization) operation in the BLUT increase smooth operations are not included in the extra or further smoothing.

In some operational scenarios, the lower and upper bounds of the moving average for the codeword, $s^Y$, may be set as follows:

$$s^{Y,u} = \min(s^Y + n, s_{max}^Y + 1) \tag{30-1}$$

$$s^{Y,l} = \max(s^Y - n, s_{min}^Y - 1) \tag{30-2}$$

where $n = \lfloor m/2 \rfloor$.

Similar to block 224, a first moving average operation may be applied as follows:

$$B^3(s^Y) = \frac{1}{(s^{Y,u} - s^{Y,l} + 1)} \sum_{l=s^{Y,l}}^{s^{Y,u}} B^2(l) \tag{31}$$

Similar to block 224, a second moving average operation may be applied as follows:

$$B^{mod}(s^Y) = \frac{1}{(s^{Y,u} - s^{Y,l} + 1)} \sum_{l=s^{Y,l}}^{s^{Y,u}} B^3(l) \tag{32}$$

Here, the LHS, $B^{mod}$, represents the final modified luma BLUT as output from the processing flow of FIG. 2C for color preservation.

Example Process Flows

Figure 4A:
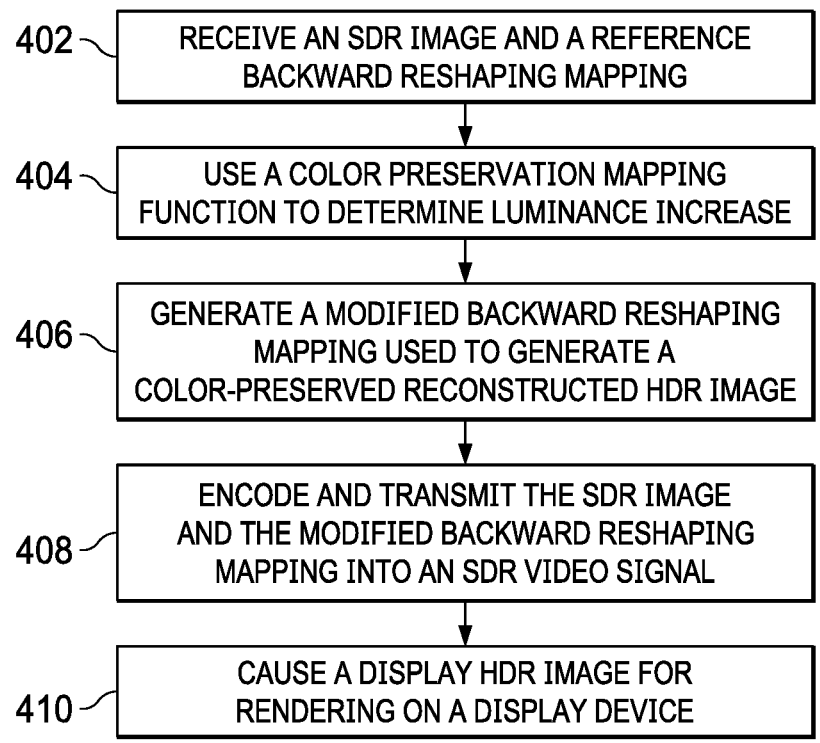
FIG. 4A and FIG. 4B illustrate example process flows.

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 402, an image processing device receives an SDR image and a reference backward reshaping mapping used to generate a reconstructed HDR image from the SDR image. The reference backward reshaping mapping comprises a reference luma backward reshaping mapping from SDR codewords into HDR codewords in the reconstructed HDR image.

In block 404, the image processing device uses a color preservation mapping function with a set of color preservation mapping inputs generated from the SDR image and the reference backward reshaping mapping to determine a plurality of luminance increase for a plurality of SDR luma histogram bins of an SDR luma histogram. The SDR luma histogram is generated based on luma codewords in the SDR image.

In block 406, the image processing device generates a modified backward reshaping mapping used to generate a color-preserved reconstructed HDR image from the SDR image. The modified backward reshaping mapping comprises a modified luma backward reshaping mapping generated from the reference backward reshaping function based on the plurality of luminance increase for the plurality of SDR luma histogram bins of the SDR luma histogram.

In block 408, the image processing device encodes and transmits the SDR image and the modified backward reshaping mapping into an SDR video signal.

In block 410, the image processing device causes a display HDR image for rendering on a display device to be generated by a recipient device of the SDR video signal based at least in the SDR image and the modified backward reshaping mapping in the SDR video signal.

In an embodiment, the reference backward reshaping mapping comprises multivariate multiple regression (MMR) coefficients for mapping luma and chroma codewords in the SDR image to chroma codewords in the reconstructed HDR image; the modified backward reshaping mapping comprises MMR coefficients for mapping the luma and chroma codewords in the SDR image to chroma codewords in the color-preserved reconstructed HDR image.

In an embodiment, the set of color preservation mapping inputs comprises HDR chroma saturation values generated by mapping SDR chroma saturation values computed from SDR chroma codewords of the SDR image with a luma modulated polynomial function.

In an embodiment, the color preservation mapping function is generated based on a regression model using a set of data points collected from a population of SDR images and reconstructed HDR images from the population of SDR images.

In an embodiment, the plurality of SDR luma histogram bins in the SDR luma histogram covers an SDR codeword space.

In an embodiment, the modified luma backward reshaping mapping is generated based at least in part on relative estimated sizes of bright areas and non-bright areas in the SDR image.

In an embodiment, the modified luma backward reshaping mapping is generated by applying a set of operations; the set of operations includes target luminance value estimation for representative points in the plurality of luma histogram bins, interpolating luminance increases for the plurality of luma histogram bins to luminance increases for a plurality of SDR codewords represented in an SDR codeword space, smoothing the luminance increases for the plurality of SDR codewords represented in an SDR codeword space, and cumulative density function matching; the set of operations is repeated multiple times to generate the modified luma backward reshaping mapping.

In an embodiment, the modified luma backward reshaping mapping is generated by smoothing an output luma backward reshaping mapping generated from the multiple iterations of the set of operations.

In an embodiment, the modified backward reshaping mapping is encoded in the SDR video signal as image metadata.

In an embodiment, the SDR video signal is of a bit depth of 8 bits, 10 bits, 12 bits, etc.

In an embodiment, the reference luma backward reshaping mapping is based on one of: a static function or a dynamic function.

Figure 4B:
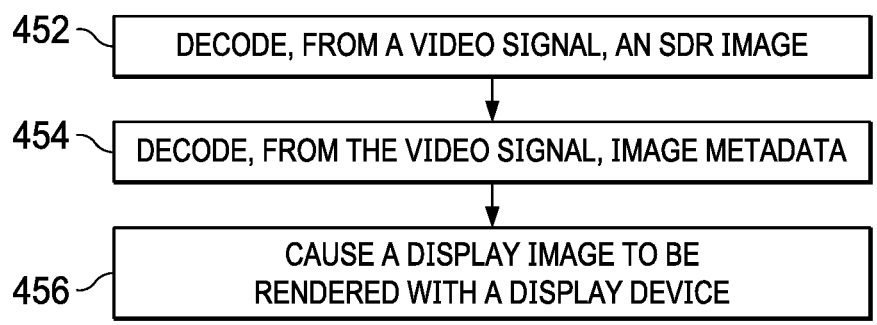

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, an image processing system decodes, from an SDR video signal, a standard dynamic range (SDR) image to be backward reshaped into a corresponding reconstructed high dynamic range (HDR) image.

In block 454, the image processing system decodes, from the SDR video signal, image metadata comprising a backward reshaping mapping. The backward reshaping mapping comprises a luma backward reshaping mapping from SDR codewords into HDR codewords in the reconstructed HDR image.

The luma backward reshaping mapping is generated by modifying a reference luma backward reshaping mapping based at least in part on a plurality of luminance increase for a plurality of SDR luma histogram bins of an SDR luma histogram. The SDR luma histogram is generated based on luma codewords in the SDR image. The plurality of luminance increases for the plurality of SDR luma histogram bins of the SDR luma histogram is determined using a color preservation mapping function with a set of color preservation mapping inputs generated from the SDR image and the reference backward reshaping mapping.

In block 456, the image processing system causes a display image derived from the reconstructed HDR image to be rendered with a display device.

In an embodiment, the luma backward reshaping mapping is represented by a set of polynomials; operational parameters specifying the set of polynomials are decoded from the SDR video signal.

In an embodiment, the backward reshaping mapping decoded from the SDR video signal comprises a chroma backward reshaping mapping represented by multivariate multiple regression (MMR) coefficients for mapping luma and chroma codewords in the SDR image to chroma codewords in the reconstructed HDR image.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
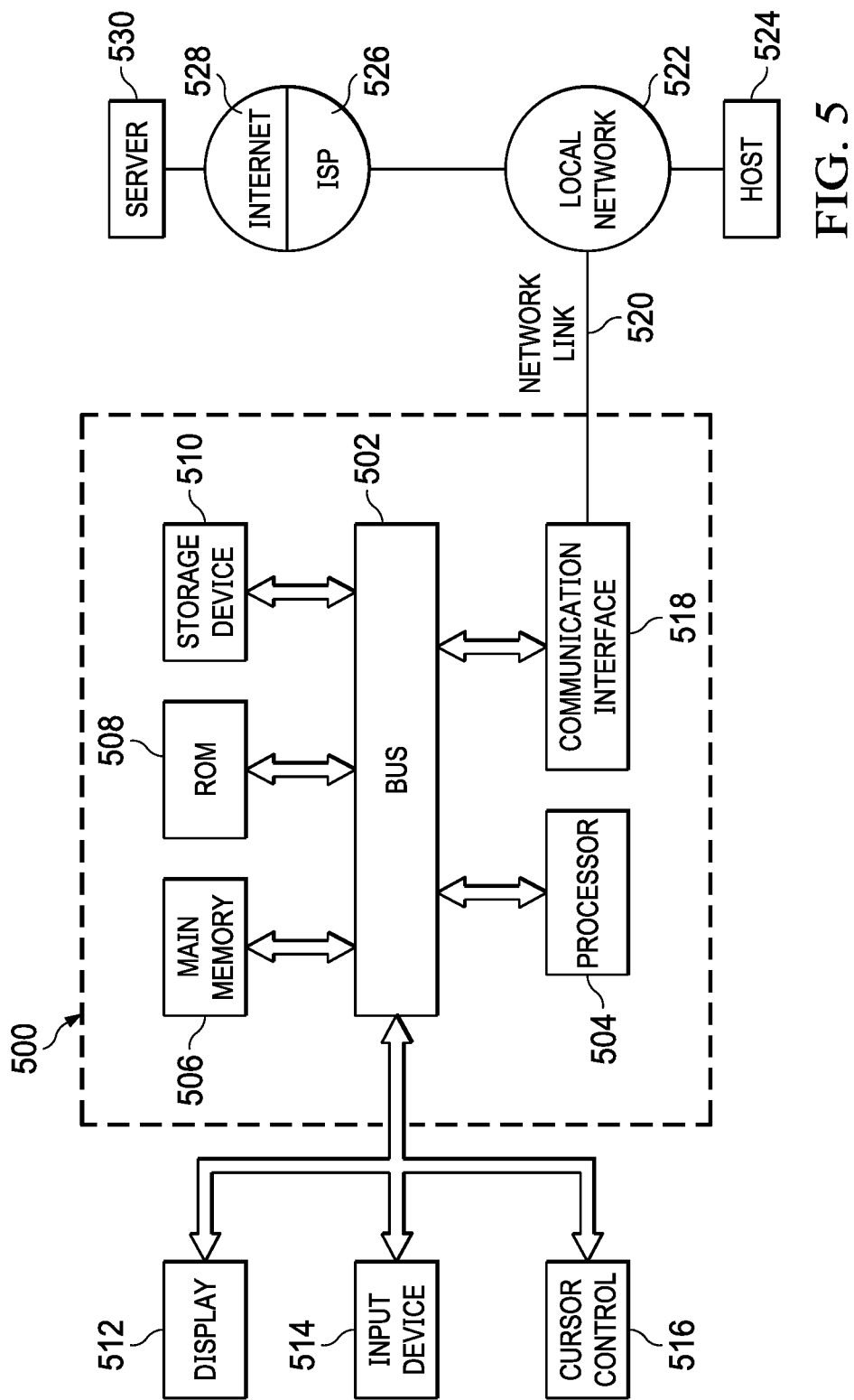
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A method comprising:

receiving a standard dynamic range (SDR) image and a reference backward reshaping mapping used to generate a reconstructed high dynamic range (HDR) image from the SDR image, the reference backward reshaping mapping comprising a reference luma backward reshaping mapping from SDR codewords into HDR codewords in the reconstructed HDR image;

using a color preservation mapping function with a set of color preservation mapping inputs generated from the SDR image and the reference backward reshaping mapping to determine a plurality of luminance increase for a plurality of SDR luma histogram bins of an SDR luma histogram, the SDR luma histogram being generated based on luma codewords in the SDR image;

generating a modified backward reshaping mapping used to generate a color-preserved reconstructed HDR image from the SDR image, the modified backward reshaping mapping comprising a modified luma backward reshaping mapping generated from the reference backward reshaping function based on the plurality of luminance increase for the plurality of SDR luma histogram bins of the SDR luma histogram;

encoding and transmitting the SDR image and the modified backward reshaping mapping into an SDR video signal;

causing a display HDR image for rendering on a display device to be generated by a recipient device of the SDR video signal based at least in the SDR image and the modified backward reshaping mapping in the SDR video signal.

EEE2. The method of EEE1, wherein the reference backward reshaping mapping comprises multivariate multiple regression (MMR) coefficients for mapping luma and chroma codewords in the SDR image to chroma codewords in the reconstructed HDR image; wherein the modified backward reshaping mapping comprises MMR coefficients for mapping the luma and chroma codewords in the SDR image to chroma codewords in the color-preserved reconstructed HDR image.

EEE3. The method of EEE2, wherein the set of color preservation mapping inputs comprises HDR chroma saturation values generated by mapping SDR chroma saturation values computed from SDR chroma codewords of the SDR image with a luma modulated polynomial function.

EEE4. The method of any of EEEs 1-3, wherein the color preservation mapping function is generated based on a regression model using a set of data points collected from a population of SDR images and reconstructed HDR images from the population of SDR images.

EEE5. The method of any of EEEs 1-4, wherein the plurality of SDR luma histogram bins in the SDR luma histogram covers an SDR codeword space.

EEE6. The method of any of EEEs 1-5, wherein the modified luma backward reshaping mapping is generated based at least in part on relative estimated sizes of bright areas and non-bright areas in the SDR image.

EEE7. The method of any of EEEs 1-6, wherein the modified luma backward reshaping mapping is generated by applying a set of operations; wherein the set of operations includes target luminance value estimation for representative points in the plurality of luma histogram bins, interpolating luminance increases for the plurality of luma histogram bins to luminance increases for a plurality of SDR codewords represented in an SDR codeword space, smoothing the luminance increases for the plurality of SDR codewords represented in an SDR codeword space, and cumulative density function matching; wherein the set of operations is repeated multiple times to generate the modified luma backward reshaping mapping.

EEE8. The method of EEE7, wherein the modified luma backward reshaping mapping is generated by smoothing an output luma backward reshaping mapping generated from the multiple iterations of the set of operations.

EEE9. The method of any of EEEs 1-8, wherein the modified backward reshaping mapping is encoded in the SDR video signal as image metadata.

EEE10. The method of any of EEEs 1-9, wherein the SDR video signal is of a bit depth of 8 bits, 10 bits, or 12 bits.

EEE11. The method of any of EEEs 1-10, wherein the reference luma backward reshaping mapping is based on one of: a static function or a dynamic function.

EEE12. A method comprising:

decoding, from an SDR video signal, a standard dynamic range (SDR) image to be backward reshaped into a corresponding reconstructed high dynamic range (HDR) image;

decoding, from the SDR video signal, image metadata comprising a backward reshaping mapping, the backward reshaping mapping comprising a luma backward reshaping mapping from SDR codewords into HDR codewords in the reconstructed HDR image;

wherein the luma backward reshaping mapping is generated by modifying a reference luma backward reshaping mapping based at least in part on a plurality of luminance increase for a plurality of SDR luma histogram bins of an SDR luma histogram;

wherein the SDR luma histogram is generated based on luma codewords in the SDR image;

wherein the plurality of luminance increases for the plurality of SDR luma histogram bins of the SDR luma histogram is determined using a color preservation mapping function with a set of color preservation mapping inputs generated from the SDR image and the reference backward reshaping mapping;

causing a display image derived from the reconstructed HDR image to be rendered with a display device.

EEE13. The method of EEE12, wherein the luma backward reshaping mapping is represented by a set of polynomials; where operational parameters specifying the set of polynomials are decoded from the SDR video signal.

EEE14. The method of EEE12 or EEE13, wherein the backward reshaping mapping decoded from the SDR video signal comprises a chroma backward reshaping mapping represented by multivariate multiple regression (MMR) coefficients for mapping luma and chroma codewords in the SDR image to chroma codewords in the reconstructed HDR image.

EEE15. A computer system configured to perform any one of the methods recited in EEEs 1-14.

EEE16. An apparatus comprising a processor and configured to perform any one of the methods recited in EEEs 1-14.

EEE17. A non-transitory computer-readable storage medium having stored thereon computer-executable instruction for executing a method in accordance with any of the methods recited in EEEs 1-14.

The invention claimed is:
1. A method comprising:
receiving a standard dynamic range (SDR) image and a reference backward reshaping mapping used to generate a reconstructed high dynamic range (HDR) image from the SDR image, the reference backward reshaping mapping comprising a reference luma backward reshaping mapping from SDR codewords into HDR codewords in the reconstructed HDR image;
using a color preservation mapping function with a set of color preservation mapping inputs generated from the SDR image and the reference backward reshaping mapping to determine a plurality of luminance increase for a plurality of SDR luma histogram bins of an SDR luma histogram, the SDR luma histogram being generated based on luma codewords in the SDR image;
generating a modified backward reshaping mapping used to generate a color-preserved reconstructed HDR image from the SDR image, the modified backward reshaping mapping comprising a modified luma backward reshaping mapping generated from the reference backward reshaping function based on the plurality of luminance increase for the plurality of SDR luma histogram bins of the SDR luma histogram;
encoding and transmitting the SDR image and the modified backward reshaping mapping into an SDR video signal;
causing a display HDR image for rendering on a display device to be generated by a recipient device of the SDR video signal based at least in the SDR image and the modified backward reshaping mapping in the SDR video signal.

2. The method of claim 1, wherein the set of color preservation mapping inputs are obtained from the SDR luma histogram and a representative color saturation value for each SDR luma histogram bin of the SDR luma histogram, computed using the chroma values of pixels in and the SDR luma histogram of the SDR image.

3. The method of claim 1, wherein the reference backward reshaping mapping comprises multivariate multiple regression (MMR) coefficients for mapping luma and chroma codewords in the SDR image to chroma codewords in the reconstructed HDR image; wherein the modified backward reshaping mapping comprises MMR coefficients for mapping the luma and chroma codewords in the SDR image to chroma codewords in the color-preserved reconstructed HDR image.

4. The method of claim 1, wherein the set of color preservation mapping inputs comprises HDR chroma saturation values generated by mapping SDR chroma saturation values computed from SDR chroma codewords of the SDR image with a luma modulated polynomial function.

5. The method of claim 1, wherein the color preservation mapping function is generated based on a regression model using a set of data points collected from a population of SDR images and reconstructed HDR images from the population of SDR images.

6. The method of claim 1, wherein the plurality of SDR luma histogram bins in the SDR luma histogram covers an SDR codeword space.

7. The method of claim 1, wherein the modified luma backward reshaping mapping is generated based at least in part on relative estimated sizes of bright areas and non-bright areas in the SDR image.

8. The method of claim 1, wherein the modified luma backward reshaping mapping is generated by applying a set of operations; wherein the set of operations includes target luminance value estimation for representative points in the plurality of luma histogram bins, interpolating luminance increases for the plurality of luma histogram bins to luminance increases for a plurality of SDR codewords represented in an SDR codeword space, smoothing the luminance increases for the plurality of SDR codewords represented in an SDR codeword space, and cumulative density function matching; wherein the set of operations is repeated multiple times to generate the modified luma backward reshaping mapping.

9. The method of claim 7, wherein the modified luma backward reshaping mapping is generated by smoothing an output luma backward reshaping mapping generated from the multiple iterations of the set of operations.

10. The method of claim 1, wherein the modified backward reshaping mapping is encoded in the SDR video signal as image metadata.

11. The method of claim 1, wherein the SDR video signal is of a bit depth of 8 bits, 10 bits, or 12 bits.

12. The method of claim 1, wherein the reference luma backward reshaping mapping is based on one of: a static function or a dynamic function.

13. A method comprising:
decoding, from an SDR video signal, a standard dynamic range (SDR) image to be backward reshaped into a corresponding reconstructed high dynamic range (HDR) image;
decoding, from the SDR video signal, image metadata comprising a backward reshaping mapping, the backward reshaping mapping comprising a luma backward reshaping mapping from SDR codewords into HDR codewords in the reconstructed HDR image;
wherein the luma backward reshaping mapping is generated by modifying a reference luma backward reshaping mapping based at least in part on a plurality of luminance increase for a plurality of SDR luma histogram bins of an SDR luma histogram;
wherein the SDR luma histogram is generated based on luma codewords in the SDR image;
wherein the plurality of luminance increases for the plurality of SDR luma histogram bins of the SDR luma histogram is determined using a color preservation mapping function with a set of color preservation mapping inputs generated from the SDR image and the reference backward reshaping mapping;
causing a display image derived from the reconstructed HDR image to be rendered with a display device.

14. The method of claim 13, wherein the set of color preservation mapping inputs are obtained from the SDR luma histogram and a representative color saturation value for each SDR luma histogram bin of the SDR luma histogram, computed using the chroma values of pixels in and the SDR luma histogram of the SDR image.

15. The method of claim 13, wherein the luma backward reshaping mapping is represented by a set of polynomials; where operational parameters specifying the set of polynomials are decoded from the SDR video signal.

16. The method of claim 13, wherein the backward reshaping mapping decoded from the SDR video signal comprises a chroma backward reshaping mapping represented by multivariate multiple regression (MMR) coefficients for mapping luma and chroma codewords in the SDR image to chroma codewords in the reconstructed HDR image.

17. An apparatus comprising a processor and configured to perform the method of claim 1.

18. A non-transitory computer-readable storage medium having stored thereon computer-executable instruction for executing a method in accordance with the method of claim 1.

19. An apparatus comprising a processor and configured to perform the method of claim 13.

20. A non-transitory computer-readable storage medium having stored thereon computer-executable instruction for executing a method in accordance with the method of claim 13.

* * * * *